United States Patent
Yakumaru et al.

(10) Patent No.: US 7,302,807 B2
(45) Date of Patent: Dec. 4, 2007

(54) REFRIGERATING CYCLE DEVICE

(75) Inventors: Yuuichi Yakumaru, Osaka (JP);
Masami Funakura, Osaka (JP);
Fumitoshi Nishiwaki, Hyogo (JP);
Noriho Okaza, Shiga (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 558 days.

(21) Appl. No.: 10/501,748

(22) PCT Filed: Mar. 27, 2003

(86) PCT No.: PCT/JP03/03782

§ 371 (c)(1),
(2), (4) Date: Jun. 30, 2004

(87) PCT Pub. No.: WO03/083381

PCT Pub. Date: Oct. 9, 2003

(65) Prior Publication Data

US 2005/0061011 A1   Mar. 24, 2005

(30) Foreign Application Priority Data

Mar. 28, 2002 (JP) ............... 2002-092139
Jun. 27, 2002 (JP) ............... 2002-188661

(51) Int. Cl.
*F25B 27/00* (2006.01)

(52) U.S. Cl. .......... 62/238.6; 62/527; 62/468; 62/196.4; 62/244; 62/238.7; 62/196.3; 62/434

(58) Field of Classification Search .......... 62/527, 62/468, 196.4, 244, 238.6, 196.3, 512

See application file for complete search history.

(56) References Cited

U.S. PATENT DOCUMENTS 6,105,386 A * 8/2000 Kuroda et al. ............ 62/513

FOREIGN PATENT DOCUMENTS

| JP | 59-225255 | 12/1984 |
|----|-----------|---------|
| JP | 07-018602 | 3/1995 |
| JP | 2931668 | 5/1999 |
| JP | 2000-088360 | 3/2000 |

(Continued)

OTHER PUBLICATIONS

Japanese International Search Report for PCT/JP03/03782, dated Jul. 22, 2003.

(Continued)

*Primary Examiner*—Cheryl Tyler
*Assistant Examiner*—Emily Iris Nalven
(74) *Attorney, Agent, or Firm*—RatnerPrestia

(57) ABSTRACT

In a refrigerating cycle device using carbon dioxide as a refrigerant, there exists a problem that the provision of a receiver at a low-pressure side increases cost and volume due to a pressure resistance design necessary for ensuring safety. By adjusting a refrigerant holding quantity of a first heat exchanger in such a manner that a refrigerant pressure of the first heat exchanger 13 is changed by operating a first decompressor 12 and a second decompressor 15, an imbalance of a refrigerant quantity between time for space cooling and time for heating or dehumidifying can be alleviated and hence, it is possible to perform an operation of the refrigerating cycle device with high efficiency with a miniaturized receiver or without providing the receiver.

11 Claims, 14 Drawing Sheets

FOREIGN PATENT DOCUMENTS

| | | |
|---|---|---|
| JP | 2000-274890 A | 10/2000 |
| JP | 2001-221458 A | 8/2001 |
| JP | 2002-019443 A | 1/2002 |
| JP | 2002-081768 A | 3/2002 |
| JP | 2002-089883 A | 3/2002 |
| WO | WO 90/07683 | 7/1990 |
| WO | WO 93/06423 | 4/1993 |

OTHER PUBLICATIONS

International Preliminary Examination Report for PCT/JP2003/003782, dated Jun. 22, 2004.

* cited by examiner

REFRIGERATING CYCLE DEVICE

THIS APPLICATION IS A U.S. NATIONAL PHASE APPLICATION OF PCT INTERNATIONAL APPLICATION PCT/JP03/03782.

TECHNICAL FIELD

The present invention relates to a refrigerating cycle device which uses carbon dioxide as a working medium (hereinafter referred to as $CO_2$ refrigerant).

BACKGROUND ART

Recently, in regard to a working medium used in a refrigerating cycle device, a conventional CFC refrigerant or an HCFC refrigerant which is considered to impart a harmful influence to an ozone layer is being replaced with an HFC refrigerant or an HC refrigerant whose ozone destruction coefficient is zero, wherein the HFC refrigerant or the HC refrigerant is used as a substitute refrigerant.

However, the HFC refrigerant has, as its material property, a drawback of having a large earth warming coefficient, while the HG refrigerant has a drawback that the refrigerant is strongly flammable although its earth warming coefficient is small. Further, an ammonium refrigerant which has been used conventionally has a drawback that the refrigerant is strongly flammable and has toxicity although the earth warming coefficient is zero.

Accordingly, an attention is focused on a $CO_2$ refrigerant which exhibits substantially no earth warming coefficient as a material, is nonflammable, nontoxic and can be manufactured at a low cost. However, the $CO_2$ refrigerant has a low critical temperature of 31.1° C. and hence, the condensation of the $CO_2$ refrigerant is not generated at a high pressure side of a usual refrigerating cycle device.

In view of the above, as shown in FIG. 19, in Japanese Patent Publication 2132329 (Japanese Examined Patent Application Publication 7-18602), by providing an internal heat exchanger 103 which performs heat exchange between an outlet line of a cooler 102 at the high pressure side and a suction line of a compressor 101, the outlet of the cooler 102 is supercooled, while a low pressure receiver 106 is provided as capacity control means which adjusts an amount of refrigerant. The entire disclosure of Japanese Patent Publication 2132329 (Japanese Examined Patent Application Publication 7-18602) is incorporated herein by reference in its entirety.

Further, with respect to a room air conditioner or a car air conditioner for space heating and cooling, an indoor-side heat exchanger is required to be miniaturized, while an outdoor-side heat exchanger is large-sized compared to the indoor-side heat exchanger to satisfy energy saving at the time of space cooling attributed to the enhancement of condensing capacity and the enhancement of capacity at the time of space heating attributed to the enhancement of the heat absorbing capacity. Accordingly, an optimum refrigerant quantity which enables an operation with high efficiency at the cooling operation in which the outdoor-side heat exchanger having a large volume assumes a high-pressure side and the condensing of refrigerant having high density is performed becomes larger than an optimum refrigerant quantity at the time of heating operation and hence, it is effective to use a receiver which also substantially performs a buffer function.

Further, in Japanese Patent Publication 2931668, as shown in FIG. 19, to minimize the energy consumption of the device for a given capacity demand, the degree of opening of a throttle valve 4 is adjusted in accordance with a predetermined value.

That is, as shown in FIG. 20, when a refrigerating cycle having a high pressure of P is changed to a refrigerating cycle having a high pressure of P1, the increase of enthalpy difference of a refrigerating capacity Q becomes higher than the increase of enthalpy difference of an input W and hence, COP is increased. However, when the refrigerating cycle having the high pressure of P1 is changed to a refrigerating cycle having a high pressure of P2, the increase of the enthalpy difference of the refrigerating capacity Q reversely becomes smaller than the increase of the enthalpy difference of the input W and hence, the COP is lowered. That is, as indicated by the refrigerating cycle having the high pressure of P1 shown in FIG. 20, the $CO_2$ refrigerant has a high pressure at which the COP becomes maximum theoretically.

Further, the heat pump cycle COP is a cycle which is obtained by adding 1 to the refrigerating cycle COP and hence, also in a case of the heat pump cycle, a value of the high pressure which ensures the maximum COP (hereinafter referred to as high-side pressure) becomes equal to a value of the high pressure of the refrigerating cycle.

The refrigerating cycle shown in FIG. 19 can be used as, for example, a space cooling device.

However, the provision of the receiver at low pressure brings about drawbacks such as the increase of cost and the increase of volume. To take a fact that, in an actual-use operation range, the pressure of the $CO_2$ refrigerant becomes extremely high compared to the HCFC refrigerant and the HFC refrigerant which are used in the conventional refrigerating cycle device into consideration, the pressure resistance design for ensuring the safety becomes more severe. Particularly, with respect to air conditioning of a car, the further reduction in volume and the further reduction of weight are requested.

Further, in general, with respect to a device which performs space cooling, space heating/dehumidifying, it is necessary to compress a refrigerant at a pressure which is higher than a pressure necessary for a cooling device. Further, a temperature of the refrigerant compressed by a compressor in the device which performs space heating/dehumidifying becomes higher than a corresponding pressure in the device which performs space cooling.

That is, when a device is used as a dehumidifying device which performs cooling, heating or dehumidifying by adding a hot water cycle to the conventional refrigerating cycle in FIG. 19, it is necessary to operate the device at a higher-side pressure. Further, a temperature of a radiator is elevated and a compression ratio is increased.

Accordingly, when a device is used as a dehumidifier which performs cooling, heating or dehumidifying by adding the hot water cycle to the conventional refrigerating cycle shown in FIG. 19, following drawbacks arise.

That is, when the temperature of a radiator is high, that is, when an ambient temperature of the radiator is high or a small-sized radiator is used, the operation of the device at the high-side pressure which is considered to minimize the energy consumption increases the compression ratio and hence, there arise drawbacks that the efficiency of a compressor is largely lowered and the reliability of the compressor may be deteriorated. Further, since the high-side pressure is high, the pressure resistance design for ensuring the safety becomes more severe.

Further, a refrigerant holding quantity at the high pressure side of the refrigerating cycle device differs between time for space heating/dehumidifying and time for space cooling and hence, an imbalance is generated with respect to the optimum refrigerant quantity. Accordingly, it is necessary to eliminate the imbalance of the refrigerant quantity between time for space cooling and time for space heating/dehumidifying by adjusting the refrigerant holding quantity in the first heat exchanger 13 by changing middle pressure.

DISCLOSURE OF THE INVENTION

In view of the above-mentioned problems, with respect to a refrigerating cycle device which uses a $CO_2$ refrigerant, it is an object of the present invention to provide a refrigerating cycle device and an operation method of the refrigerating cycle device which can realize an efficient operation, while ensuring the reliability, by making use of the features of a $CO_2$ refrigerating system and by miniaturizing or eliminating a low-pressure receiver.

Further, in view of the above-mentioned problems, with respect to a dehumidifying device which uses a $CO_2$ refrigerant, it is an object of the present invention to provide a dehumidifying device and a dehumidifying method which can realize an efficient and reliable operation while eliminating an imbalance of an optimum refrigerant quantity between time for space cooling and time for space heating/dehumidifying by making use of the features of a $CO_2$ refrigerating system and by adjusting an intermediate pressure without elevating a high-side pressure.

To solve the above problems, a first aspect of the present invention is a refrigerating cycle device comprising a compressor (10), a refrigerant-water heat exchanger (11), a first decompressor (12), a first heat exchanger (13), a second decompressor (15), a second heat exchanger (16), an internal heat exchanger (17) and a hot water cycle (17, 18, 19, 20), wherein said hot water cycle (17, 18, 19, 20) includes a heater core (19) which sucks hot water at the downstream side of the refrigerant-water heat exchanger (11), said compressor (10) compresses a refrigerant which is carbon dioxide, said refrigerant-water heat exchanger (11) performs heat exchange between said compressed refrigerant and the hot water in said hot water cycle (17, 18, 19, 20), said first decompressor (12) decompresses or does not decompress said compressed refrigerant, said first heat exchanger (13) performs heat exchange of said refrigerant which is decompressed by said first decompressor (12), said internal heat exchanger (14) performs heat exchange between said refrigerant which is subjected to heat exchange by said first heat exchanger (13) and said refrigerant sucked by said compressor (10), said second decompressor (15) decompresses said refrigerant which is subjected to heat exchange by said internal heat exchanger (14), said second heat exchanger (16) performs heat exchange of said refrigerant which is decompressed by the second decompressor (15), and a refrigerant pressure of said first heat exchanger (13) is changed by operating said first decompressor (12) and/or said second decompressor (15) so as to adjust a refrigerant holding quantity of said first heat exchanger (13) whereby an imbalance of a refrigerant quantity between time for space cooling and time for space heating/dehumidifying is alleviated.

Further, a second aspect of the present invention is a refrigerating cycle device according to the first aspect of the present invention, wherein said refrigerating cycle device comprises compressor discharge temperature detection means (35) which detects a discharge temperature of said compressor (10), compressor suction temperature detection means which detects a suction temperature of said compressor (10) or compressor discharge pressure detection means which detects a discharge pressure of said compressor (10), and the adjustment of the refrigerant holding quantity of said first heat exchanger (13) by changing refrigerant pressure of said first heat exchanger (13) means to control said second decompressor (15) using a value detected by said compressor discharge temperature detection means (35) said compressor suction temperature detection means or said compressor discharge pressure detection means.

Further, a third invention of the present invention is a refrigerating cycle device according to the first invention of the present invention, wherein said refrigerating cycle device comprises a first bypass circuit (22) which connects the discharge side of said compressor (10) and the inlet of said first heat exchanger (13) by way of a first open/close valve (21).

Further, a fourth invention of the present invention is a refrigerating cycle device according to the third invention of the present invention, wherein said refrigerating cycle device comprises a first heat exchanger temperature detection means (36) which detects a refrigerant temperature of said first heat exchanger (13) and said first decompressor (12) or said first open/close valve (21) is controlled using a value which is detected by said first heat exchanger temperature detection means (36).

Further, a fifth aspect of the present invention is a refrigerating cycle device according to the first aspect of the present invention, wherein said refrigerating cycle device comprises a second bypass circuit (24) which connects the inlet and the outlet of said second heat exchanger (16) by way of a second open/close valve (23).

Further, a sixth aspect of the present invention is a refrigerating cycle device according to the first aspect of the present invention, wherein said refrigerating cycle device comprises a third bypass circuit (26) which connects an inlet and an outlet of the first heat exchanger (13) by way of a third open/close valve (25).

Further, a seventh aspect of the present invention is a refrigerating cycle device according to the first aspect of the present invention, wherein said refrigerating cycle device comprises a fourth open/close valve (27) at an inlet of said first heat exchanger (13).

Further, an eighth aspect of the present invention is a refrigerating cycle device according to the first aspect of the present invention, wherein said refrigerating cycle device comprises:

a fifth open/close valve (28) which is disposed between an outlet of said refrigerant-water heat exchanger (11) and said first decompressor (12);

a first three-way valve (30) which is disposed between an outlet of said first heat exchanger (13) and an inlet of said internal heat exchanger (14);

a fourth bypass circuit (29) which is connected by having one end thereof disposed between an outlet of said refrigerant-water heat exchanger (11) and an inlet of said fifth open/close valve (28) and the other end formed of said first three-way valve (30);

a second three-way valve (31) which is disposed between an outlet of said internal heat exchanger (14) and an inlet of said second decompressor (15);

a fifth bypass circuit (32) which is connected by having one end thereof formed of said second three-way valve (31)

and the other end thereof disposed between an outlet of said fifth open/close valve (28) and an inlet of said first decompressor (12);

a sixth bypass circuit (34) which is connected by having one end thereof disposed between an outlet of said first heat exchanger (13) and said first three-way valve (30) and the other end thereof disposed between said second three-way valve (31) and said second decompressor (15) and by way of a sixth open/close valve (33); and refrigerant circulation mode changeover means which selectively changes over a steady mode in which the refrigerant which is flown out from said refrigerant-water heat exchanger (11) is circulated by way of said fifth open/close valve (28) and a start mode in which the refrigerant is circulated in said fourth bypass circuit (29) and said fifth bypass circuit (32).

Further, a ninth aspect of the present invention is directed to an operation method of a refrigerating cycle device for operating a refrigerating cycle device which comprises a compressor, a refrigerant-water heat exchanger, a first decompressor, a first heat exchanger, a second decompressor, a second heat exchanger, an internal heat exchanger and a hot water cycle, said hot water cycle having a heater core which sucks hot water at the downstream side of said refrigerant-water heat exchanger, wherein said compressor compresses a refrigerant which is carbon dioxide, said refrigerant-water heat exchanger performs heat exchange between said compressed refrigerant and hot water in said hot water cycle, said first decompressor decompresses or does not decompress compressed said refrigerant, said first heat exchanger performs heat exchange of said refrigerant which is decompressed by said first decompressor, said internal heat exchanger performs heat exchange between said refrigerant which is subjected to the heat exchange by said first heat exchanger and the refrigerant sucked by said compressor, said second decompressor decompresses said refrigerant which is subjected to the heat exchange by said internal heat exchanger, said second heat exchanger performs heat exchange of said refrigerant which is decompressed by said second decompressor, and a refrigerant pressure of said first heat exchanger is changed by operating said first decompressor and/or said second decompressor so as to adjust a refrigerant holding quantity of said first heat exchanger whereby an imbalance of a refrigerant quantity between time for space cooling and time for space heating/dehumidifying is alleviated.

Further, a tenth aspect of the present invention is directed to a dehumidifying device which comprises a compressor (11), a refrigerant-water heat exchanger (111), a first decompressor (112), a first heat exchanger (113), a second decompressor (115), a second heat exchanger (116), an internal heat exchanger (114) and a hot water cycle (117, 118, 119, 120), said hot water cycle (117, 118, 119, 120) having a heater core (119) which sucks hot water at the downstream side of said refrigerant-water heat exchanger (111) wherein said compressor (110) compresses a refrigerant which is carbon dioxide, said refrigerant-water heat exchanger (111) performs heat exchange between the compressed said refrigerant and hot water in said hot water cycle (117, 118, 119, 120), said first decompressor (112) decompresses the compressed said refrigerant, said first heat exchanger (113) performs heat exchange of said refrigerant which is decompressed by said first decompressor (112), said internal heat exchanger (114) performs heat exchange between said refrigerant which is subjected to the heat exchange by said first heat exchanger (113) and a refrigerant sucked by said compressor (110), said second decompressor (115) decompresses said refrigerant which is subjected to the heat exchange by said internal heat exchanger (114), and said second heat exchanger (116) performs heat exchange of said refrigerant which is decompressed by said second decompressor (115).

Further, an eleventh aspect of the present invention is directed to the dehumidifying device according to the tenth aspect of the present invention, wherein the dehumidifying device comprises second heat exchanger refrigerant temperature detection means (130) which detects a temperature of said refrigerant in said second heat exchanger (116), and said second decompressor (115) has a decompression level thereof controlled in response to the temperature detected by said second heat exchanger temperature detection means (130).

Further, a twelfth aspect of the present invention is directed to the dehumidifying device according to the eleventh aspect of the present invention, wherein said first decompressor (112) has a decompression level thereof controlled in response to said temperature detected by said second heat exchanger temperature detection means (130).

Further, a thirteenth aspect of the present invention is directed to the dehumidifying device according to the tenth aspect of the present invention, wherein the dehumidifying device comprises first heat exchanger refrigerant temperature detection means (131) which detects a temperature of said refrigerant in said first heat exchanger (113), and said first decompressor (112) has a decompression level thereof controlled in response to said temperature detected by said first heat exchanger refrigerant temperature detection means (131).

Further, a fourteenth aspect of the present invention is directed to the dehumidifying device according to the tenth aspect of the present invention, wherein the dehumidifying device comprises blow-off air temperature detection means (134) which detects a temperature of blow-off air blown off by way of said heater core (119) and compressor operating frequency control means (132) which controls operating frequency of said compressor (110), and said compressor operating frequency control means (132) controls the operating frequency of said compressor (110) in response to said detected air temperature.

Further, a fifteenth aspect of the present invention is directed to the dehumidifying device according to the tenth aspect of the present invention, wherein the dehumidifying device comprises discharged refrigerant temperature detection means (133) which detects a discharged refrigerant temperature of said compressor (110) and a bypass circuit (136) which bypasses between an outlet of said second heat exchanger (116) and an inlet of said compressor (110) byway of an open/close valve (135) and said open/close valve (135) has opening and closing thereof controlled in response to said detected discharged refrigerant temperature.

Further, a sixteenth aspect of the present invention is directed to the dehumidifying device according to the tenth aspect of the present invention which is used as an air conditioner for a vehicle.

Further, a seventeenth aspect of the present invention is directed to dehumidifying method of dehumidifying using a dehumidifying device which comprises a compressor, a refrigerant-water heat exchanger, a first decompressor, a first heat exchanger, a second decompressor, a second heat exchanger, an internal heat exchanger and a hot water cycle, said hot water cycle having a heater core which sucks hot water at the downstream side of said refrigerant-water heat exchanger, wherein said compressor compresses a refrigerant which is carbon dioxide, said refrigerant-water heat exchanger performs heat exchange between said compressed refrigerant and the hot water in said hot water cycle, said first decompressor decompresses said compressed refrigerant, said first heat exchanger performs heat exchange of said refrigerant which is decompressed by said first decompressor, said internal heat exchanger performs heat exchange between said refrigerant which is subjected to the heat exchange by said first heat exchanger and the refrigerant sucked by said compressor, said second decompressor decompresses said refrigerant which is subjected to the heat exchange by said internal heat exchanger, and said second heat exchanger performs heat exchange of said refrigerant which is decompressed by said second decompressor.

Figure 1:
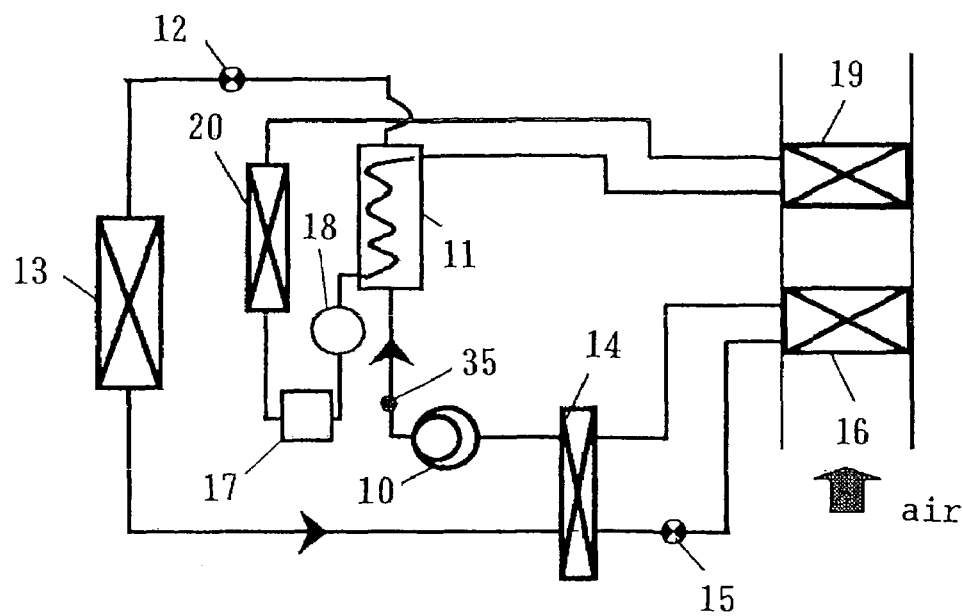
FIG. 1 is a view of a refrigerating cycle device according to an embodiment 1 of the present invention.

EXPLANATION OF SYMBOLS 10 compressor
11 refrigerant-water heat exchanger
12 first decompressor
13 first heat exchanger
14 internal heat exchanger
15 second decompressor
16 second heat exchanger
17 power engine
18 pump
19 heater core
20 radiator
21 first open/close valve
22 first bypass circuit
23 second open/close valve
24 second bypass circuit
25 third open/close valve
26 third bypass circuit
27 fourth open/close valve
28 fifth open/close valve
29 fourth bypass circuit
30 first three-way valve
31 second three-way valve
32 fifth bypass circuit
33 sixth open/close valve
34 sixth bypass circuit
35 compressor discharge temperature detection means
36 first heat exchanger temperature detection means
101 compressor
102 cooling device
103 internal heat exchanger
104 throttling means
105 evaporator
106 low-pressure refrigerant receiver
110 compressor
111 refrigerant-water heat exchanger
112 first decompressor
113 first heat exchanger
114 internal heat exchanger
115 second decompressor
116 second heat exchanger
117 power engine
118 pump
119 heater core
120 radiator
130 second heat exchanger refrigerant temperature detection means
131 first heat exchanger refrigerant temperature detection means
132 compressor operating frequency detection means -continued 133 compressor discharge refrigerant temperature detection means
134 blow-off temperature detection means
135 open/close valve
136 bypass circuit

BEST MODE FOR CARRYING OUT THE INVENTION

Embodiments of the present invention are explained hereinafter in conjunction with drawings.

EMBODIMENT 1

FIG. 1 is a constitutional view showing a refrigerating cycle device according to embodiment 1 of the present invention. The refrigerating cycle uses a $CO_2$ refrigerant as a working fluid and adopts a compressor 10, a refrigerant-water heat exchanger 11, a first decompressor 12, a first heat exchanger 13, an internal heat exchanger 14, a second decompressor 15, a second heat exchanger 16 as basic constitutional elements thereof. An outlet-side line of the first heat exchanger 13 and a suction line of the compressor 10 which is arranged at an outlet of the second heat exchanger 16 are subjected to a heat exchange by the internal heat exchanger 14. On the other hand, the hot water cycle is constituted of a pump 18 which circulates hot water heated by the refrigerant-water heat exchanger, a heater core 19, a radiator 20 and a power engine 17.

Here, the operation of the refrigerating cycle device shown in FIG. 1 at the time of space cooling is explained.

First of all, at the time of space cooling, the first decompressor 12 is fully opened and the second decompressor 15 performs an operation as a decompressor. That is, the refrigerant which is formed into a gas of high temperature and high pressure by being compressed by the compressor 10 passes through the first decompressor 12 from the refrigerant-water heat exchanger 11 and is cooled by outdoor air by the first heat exchanger 13. Then, the refrigerant is subjected to a heat exchange with a refrigerant in a suction line of the compressor 10 at the internal heat exchanger 14 and hence, the refrigerant is further cooled. Thereafter, the refrigerant is decompressed by the second decompressor 15 and assumes a gas-liquid two-phase state and is introduced into the second heat exchanger 16. In this second heat exchanger 16, the refrigerant is evaporated due to the heat absorption from indoor air and is formed into a gas-liquid two-phase state or a gas state, then is subjected to a heat exchange with a refrigerant flown from the first heat exchanger 13 at the internal heat exchanger 14 so that the further heat absorption is performed and, thereafter, the refrigerant is compressed again by the compressor 10. Air is cooled by the second heat exchanger 16.

Next, the operation at the time of space heating/dehumidifying is explained.

At the time of space heating/dehumidifying, the first decompressor 12 and the second decompressor 15 perform an operation as a decompressor.

That is, the refrigerant which is formed into a gas of high temperature and high pressure by being compressed by the compressor 10 is cooled by being subjected to a heat exchange with cooling water in a water circuit which is circulated by a pump 18 at the refrigerant-water heat exchanger 11 and, thereafter, is decompressed to an intermediate pressure by the first decompressor 12 and is introduced into the first heat exchanger 13. The refrigerant which is cooled by outdoor air at the first heat exchanger 13 is subjected to a heat exchange with a refrigerant in a suction line of the compressor 10 at the heat exchanger 14 and hence is further cooled. Thereafter, the refrigerant is decompressed by the second decompressor 15 and assumes a gas-liquid two-phase state of low temperature and low pressure and is introduced into the second heat exchanger 16. In this second heat exchanger 16, the refrigerant is evaporated due to heat absorption from indoor air and is formed into a gas-liquid two-phase state or a gas state. Then the refrigerant is further subjected to the heat absorption by a heat exchange with the refrigerant which flows from the first heat exchanger 13 in the internal heat exchanger 14 and, thereafter, the refrigerant is compressed again by the compressor 10.

Further, the cooling water which is heated by the refrigerant-water heat exchanger 11 flows into the heater core 19 installed in a room and heats the air which is cooled and dehumidified by the second heat exchanger 16 whereby the space heating can be performed while performing the space dehumidifying. Then, the cooling water is heated by the power engine 17 (for example, a heat generating source such as an engine or a battery) and is again made to flow in the refrigerant-water heat exchanger 11.

Here, as described above, since carbon dioxide is a high pressure refrigerant and hence, from a viewpoint of pressure resistance design, it is necessary to use, instead of a fin tube type heat exchanger, a heat exchanger having a narrower tube diameter (for example, a micro tube type heat exchanger). Further, with respect to an air conditioner for a vehicle, the reduction of volume and the reduction of weight are strongly requested. Accordingly, in view of a fact that while the first heat exchanger 13 having a large volume assumes a high pressure side at the time of space cooling, the refrigerant-water heat exchanger 11 having a small volume assumes the high pressure side at the time of space heating/dehumidifying and hence, a large difference is generated with respect to a high pressure side refrigerant holding quantity, an imbalance between an optimum refrigerant quantity at the time of space cooling and an optimum refrigerant quantity at the time of space heating/dehumidifying is studied. As a result of the study, it is found that when only the first decompressor 12 is operated at the time of space heating/dehumidifying, the first heat exchanger 13 having a large volume assumes the low pressure side and hence, the relationship (optimum refrigerant quantity at the time of space heating/dehumidifying)<(optimum refrigerant quantity at the time of space cooling) is established. Accordingly, when the optimum refrigerant quantity at the time of space cooling is filled, when only the first decompressor 12 is operated at the time of space heating/dehumidifying, there arises a state that the refrigerant quantity is excessively large thus causing a drawback that the high pressure is excessively elevated.

Further, when only the second decompressor 15 is operated at the time of space heating/dehumidifying in the same manner at the time of space cooling, a temperature of air introduced into the first heat exchanger 13 is lower at the time of space heating/dehumidifying than at the time of space cooling and hence, the refrigerant temperature is also lowered so that the refrigerant density is increased whereby a refrigerant quantity which is held in the first heat exchanger 13 is increased compared to the time of space cooling. That is, it is found that the relationship (optimum refrigerant quantity at the time of space heating/dehumidifying)>(optimum refrigerant quantity at the time of space cooling) is established. Accordingly, when the optimum refrigerant quantity at the time of space cooling is filled, when only the second decompressor 15 is operated at the time of space heating/dehumidifying, there arises a state that the refrigerant quantity is small thus causing drawbacks such as the reduction of a circulation quantity due to the elevation of a suction temperature or an excessive elevation of a discharge temperature.

Accordingly, by operating the first decompressor 12 and the second decompressor 15 and by adjusting a refrigerant holding quantity in the first heat exchanger 13 by setting the pressure inside the first heat exchanger 13 to an intermediate pressure at the time of space heating/dehumidifying, it is possible to eliminate the imbalance of refrigerant quantity between time of space cooling and time of space heating/dehumidifying whereby the operation of the refrigerating cycle device can be performed with high efficiency while miniaturizing a receiver or without using the receiver.

EMBODIMENT 2

Figure 8:
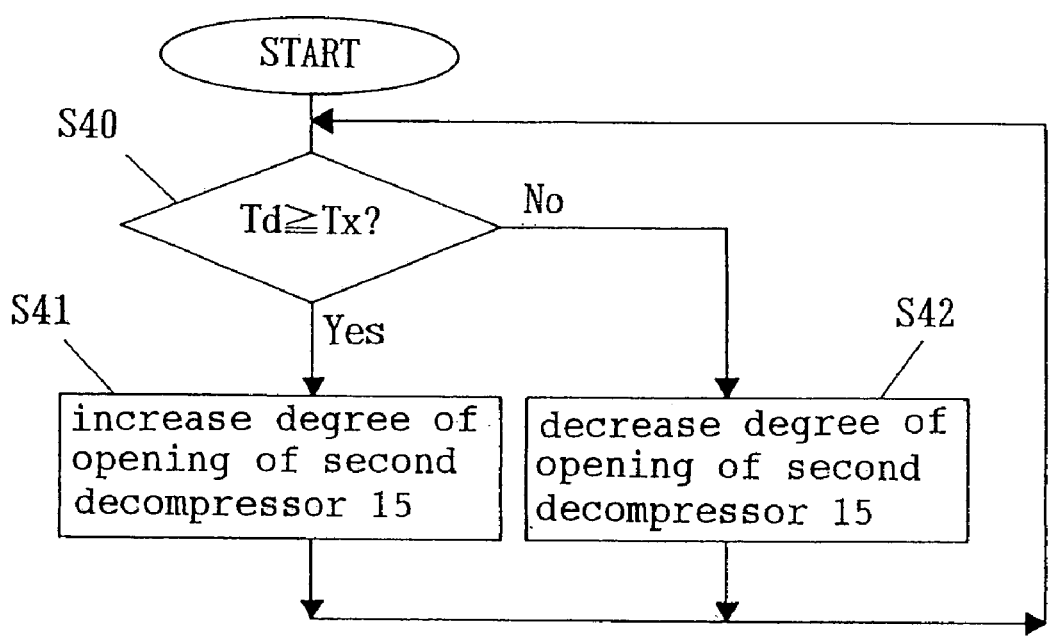
FIG. 8 is a control flow chart of a refrigerating cycle device according to an embodiment 2 of the present invention.

With respect to the embodiment 2 of the present invention, the manner of operation of the second decompressor 15 at the time of space heating/dehumidifying in the refrigerating cycle device shown in FIG. 1 is explained in conjunction with a flow chart shown in FIG. 8. The second decompressor 15 is a valve which is capable of adjusting a flow rate.

At the time of space heating/dehumidifying, a discharge temperature Td detected by compressor discharge temperature detection means 35 and a target set discharge temperature Tx are compared in step 40. Then, when Td is equal to or more than Tx, this implies a state that the refrigerant is in short and processing is advanced to step 41 in which a control is made to increase the degree of opening of the second decompressor 15. Accordingly, the intermediate pressure in the first heat exchanger 13 is lowered so as to lower the refrigerant holding quantity in the first heat exchanger 13 whereby the refrigerant shortage state can be eliminated. After completion of control of the second decompressor 15, the processing returns to step 40.

Further, when Td is smaller than Tx, this implies a state in which the refrigerant is excessive and processing is advanced to step 42 in which a control is made to decrease the degree of opening of the second decompressor 15. Accordingly, the intermediate pressure in the first heat exchanger 13 is increased so that the refrigerant holding quantity in the first heat exchanger 13 is increased whereby an excessive refrigerant state can be eliminated. After completion of control of the second decompressor 15, the processing returns to the step 40. Here, there is no problem even when a suction temperature, a discharge pressure or a degree of suction superheat is used as an object to be compared in step 40 instead of the discharge temperature.

In this manner, even when a refrigerating cycle is largely changed such as the change of an ambient temperature or the change of a rotational speed of the compressor, it is possible to alleviate the imbalance of refrigerant quantity between time for space cooling and time for space heating/dehumidifying by controlling the second decompressor 15 and hence, it is possible to perform the highly-efficient operation of the refrigerating cycle device with high versatility by miniaturizing the receiver or without the receiver.

EMBODIMENT 3

Figure 2:
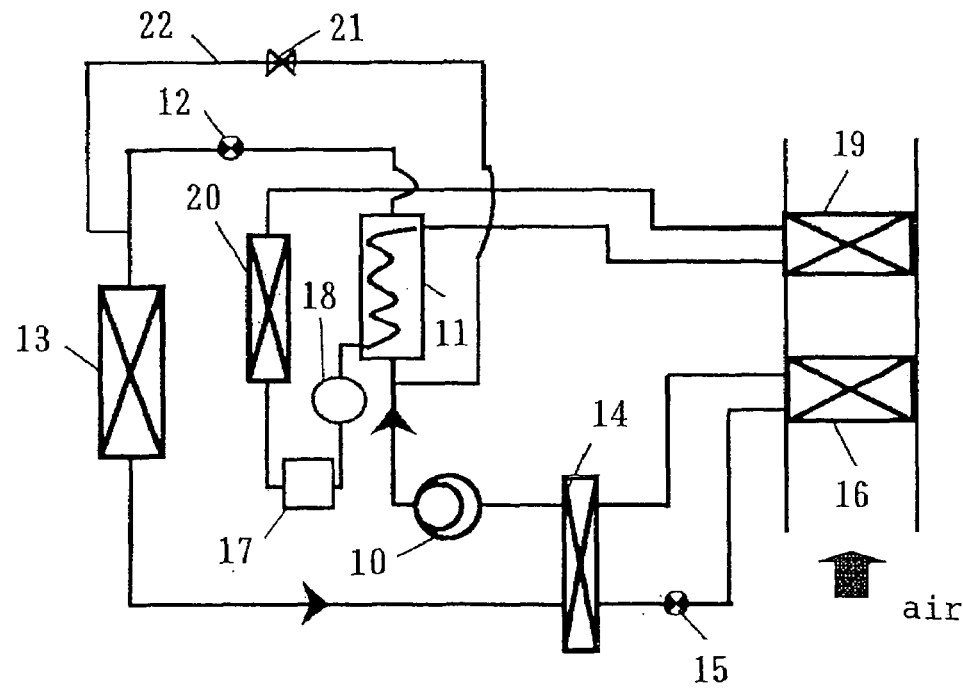
FIG. 2 is a view of a refrigerating cycle device according to an embodiment 3 of the present invention.

FIG. 2 is a constitutional view showing a refrigerating cycle device according to the embodiment 3 of the present invention. Points which make this embodiment different from the embodiment 1 are explained hereinafter. The refrigerating cycle device includes a first bypass circuit 22 which connects an outlet of the compressor 10 and an inlet of the first heat exchanger 13 by way of a first open/close valve 21.

First of all, the manner of operation of the refrigerating cycle device shown in FIG. 2 at the time of space cooling is explained. At the time of space cooling, the second decompressor 15 performs an operation as a decompressor while fully closing the first decompressor 12 and fully opening the first open/close valve 21. Accordingly, by making the refrigerant flow in the first bypass circuit 22 by opening the first open/close valve 21, it is possible to prevent the generation of pressure loss of the refrigerant in the refrigerant-water heat exchanger 11.

Next, the manner of operation at the time of space heating/dehumidifying is explained. At the time of space heating/dehumidifying, the first decompressor 12 and the second decompressor 15 perform an operation as a decompressor while fully closing the first open/close valve 21. That is, at the time of space heating/dehumidifying, the manner of operation which is substantially equal to the manner of operation of the embodiment 1 is performed.

In this manner, by providing the first bypass circuit 22, the reduction of the pressure loss at the time of space cooling can be achieved and hence, it is possible to perform the operation of the refrigerating cycle device with high efficiency with respect to both of space cooling and space heating.

EMBODIMENT 4

Figure 3:
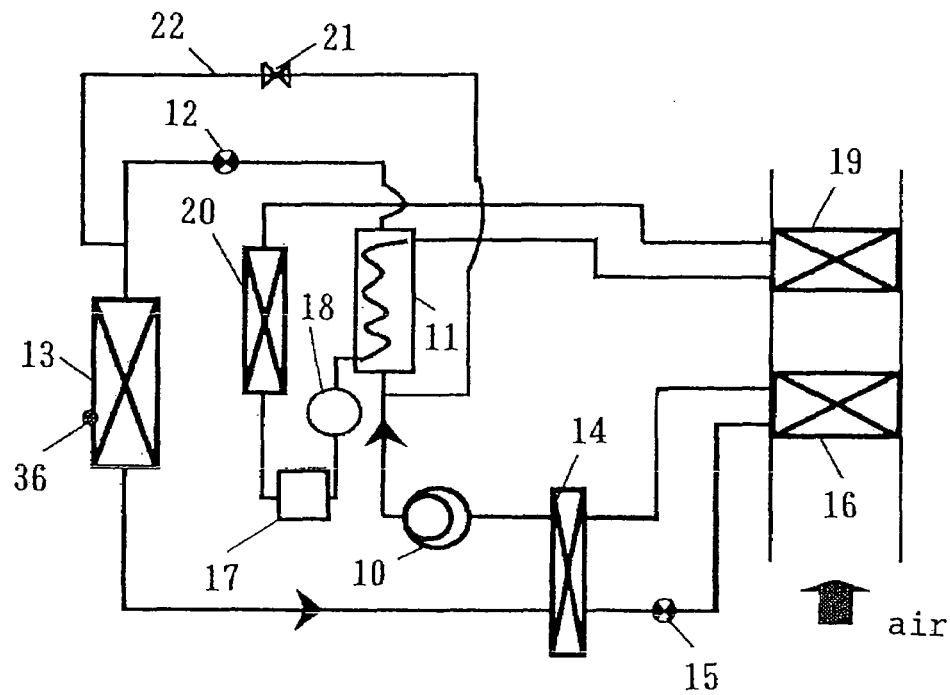
FIG. 3 is a view of a refrigerating cycle device according to an embodiment 4 of the present invention.

FIG. 3 is a constitutional view showing a refrigerating cycle device according to the embodiment 4 of the present invention. Points which make this embodiment different from the embodiment 3 are explained hereinafter. This refrigerating cycle device includes first heat exchanger temperature detection means 36 which detects a refrigerant temperature in the first heat exchanger 13.

First of all, the manner of operation of the refrigerating cycle device shown in FIG. 3 is explained. At the time of space cooling, the second decompressor 15 performs an operation as a decompressor while fully closing the first decompressor 12 and fully opening the first open/close valve 21. Accordingly, at the time of space cooling, the manner of operation substantially equal to the manner of operation of the embodiment 3 is performed.

Next, the manner of operation at the time of space heating/dehumidifying is explained. At the time of space heating/dehumidifying, the first decompressor 12 and the second decompressor 15 perform an operation as a decompressor while fully closing the first open/close valve 21.

Here, when an outdoor temperature is low or when a heat radiation fan of the first heat exchanger 13 is not operated, there arises a drawback that the low pressure is lowered and a frost is generated in the first heat exchanger 13 and hence the coefficient of performance (COP) of the refrigerating cycle device is lowered. Accordingly, the manner of operation of the first decompressor 12 or the first open/close valve 21 at the refrigerating cycle device shown in FIG. 3 which can cope with such cases is explained.

At the time of space heating/dehumidifying, a temperature Teva of the first heat exchanger 13 and a set temperature Ty (for example, 0° C.) are compared. When Teva is equal to or less than Ty, this implies a state that there exists a danger that a frost is generated in the first heat exchanger 13 and hence, the COP is lowered. Accordingly, a control is performed so as to bring the degree of opening of the first decompressor 12 to a full open position. Accordingly, the first heat exchanger 13 functions as a radiator and hence, the frost can be obviated. On the other hand, when Teva is larger than Ty, the first decompressor 12 is again made to function as a decompressor. Accordingly, the defrosting operation can be performed without performing the operation in a reverse cycle which lowers an indoor blow-off temperature and deteriorates the comfortableness.

Further, in comparing a temperature Teva of the first heat exchanger 13 and a set temperature Ty (for example 0° C.), when Teva is equal to or less than Ty, by performing a control such that the first open/close valve 21 assumes a fully open position, it is possible to bypass the refrigerant-water heat exchanger 11 which functions as a radiator and hence, a heat radiation quantity at the first heat exchanger 13 can be further increased and hence, the defrosting operation can be completed within a shorter time. Further, when Teva is larger than Ty, a control is made to make the first open/close valve 21 assume the fully closed position again.

In this manner, by controlling the first decompressor 12 or the first open/close valve 21, the frost at the time of space heating/dehumidifying can be obviated whereby the operation of the refrigerating cycle device can be performed with high comfortableness and with high efficiency.

EMBODIMENT 5

Figure 4:
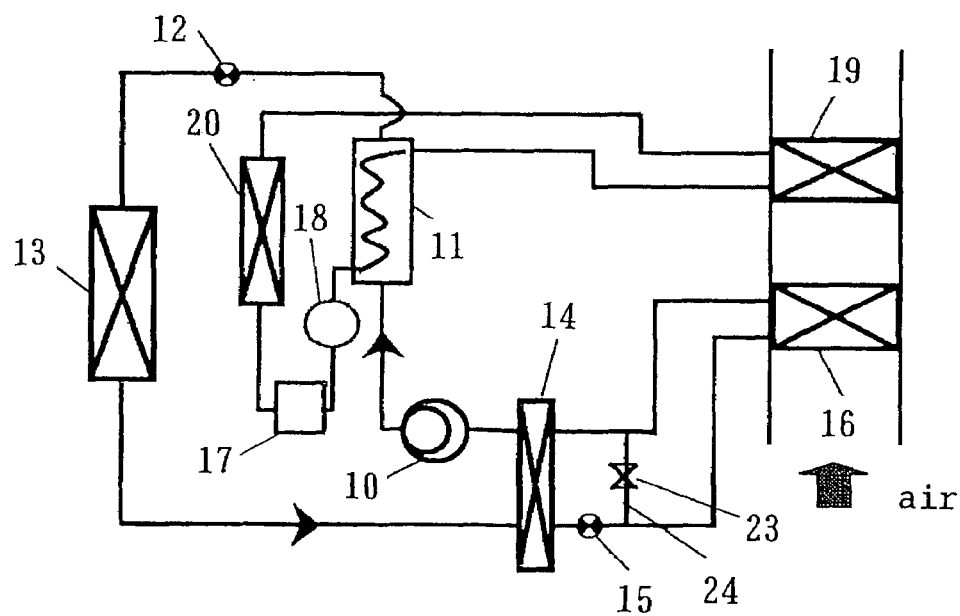
FIG. 4 is a view of a refrigerating cycle device according to an embodiment 5 of the present invention.

FIG. 4 is a constitutional view showing a refrigerating cycle device according to the embodiment 5 of the present invention. Points which make this embodiment different from the embodiment 1 are explained hereinafter. This refrigerating cycle device includes a second bypass circuit 24 which connects an inlet and an outlet of the second heat exchanger 16 by way of a second open/close valve 23.

First of all, the manner of operation of the refrigerating cycle device shown in FIG. 4 at the time of space cooling is explained. At the time of space cooling, the second decompressor 15 functions as a decompressor while fully opening the first decompressor 12 and fully closing the second open/close valve 23. That is, at the time of space cooling, the manner of operation substantially equal to the manner of operation of the first embodiment 1 is performed.

Next, the manner of operation at the time of space heating/dehumidifying is explained. At the time of space heating/dehumidifying, the first decompressor 12 and the second decompressor 15 function as a decompressor while fully opening the second open/close valve 23. Accordingly, a heat absorption quantity at the second heat exchanger 16 which constitutes an indoor heat exchanger is decreased and hence, it is possible to rapidly increase an indoor heating capacity.

Here, the refrigerant having small dryness fraction flows in the second bypass circuit 24. However, since the refrigerant is heated due to a heat exchange with the refrigerant flown out from an outlet of the first heat exchanger 13 at the internal heat exchanger 14, the possibility that the liquid refrigerant is taken into the compressor 10 is low.

Further, when a discharge temperature reaches a fixed value (for example, 70° C.) after starting the operation of the compressor 10, a control is made to fully close the second open/close valve 23 so as to ensure the dehumidifying ability of the second heat exchanger 16 at a fixed value or more. Further, timing at which the second open/close valve 23 is fully closed may be a point of time after a lapse of time (for example, 10 min) from starting of the operation of the compressor 10.

As described above, by providing the second bypass circuit 24, at the time of space heating/dehumidifying, the start-up performance of the heating capacity immediately after starting of the operation of the compressor can be enhanced and hence, it is possible to perform the operation of the refrigerating cycle device which exhibits the rapid heating property.

EMBODIMENT 6

Figure 5:
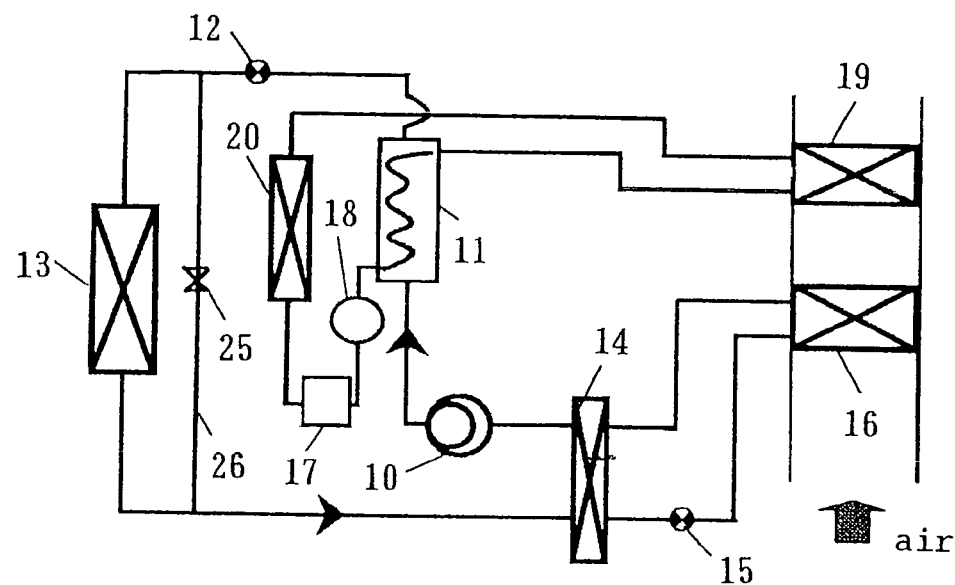
FIG. 5 is a view of a refrigerating cycle device according to an embodiment 6 of the present invention.

FIG. 5 is a constitutional view showing a refrigerating cycle device according to the embodiment 6 of the present invention. Points which make this embodiment different from the embodiment 1 are explained hereinafter. This refrigerating cycle device includes a third bypass circuit 26 which connects an inlet and an outlet of the first heat exchanger 13 by way of a third open/close valve 25.

First of all, the manner of operation of the refrigerating cycle device shown in FIG. 5 at the time of space cooling is explained. At the time of space cooling, the second decompressor 15 functions as a decompressor while fully opening the first decompressor 12 and fully closing the third open/close valve 25. Accordingly, at the time of space cooling, the manner of operation substantially equal to the manner of operation of the first embodiment 1 is performed so as to obtain substantially the same advantageous effects.

Next, the manner of operation at the time of space heating/dehumidifying is explained. At the time of space heating/dehumidifying, the first decompressor 12 and the second decompressor 15 function as a decompressor while fully opening the third open/close valve 25.

That is, at the time of space heating/dehumidifying, the refrigerant which is formed into a gas of high temperature and high pressure after being compressed by the compressor 10 is cooled by a heat exchange with cooling water in a water circuit which is circulated by the pump 18 in the refrigerant-water heat exchanger 11. Then, the refrigerant which is cooled by the refrigerant-water heat exchanger 11 is decompressed to an intermediate pressure by the first decompressor 12 and flows into the first heat exchanger 13 and the third bypass circuit 26 in a bifurcated manner. Here, by setting a fluid passage resistance of the third bypass circuit 26 smaller than a fluid passage resistance of the first heat exchanger 13, the refrigerant hardly flows into the first heat exchanger 13. The refrigerant which flows into the first heat exchanger 13 or the third bypass circuit 26 is subjected to a heat exchange with the refrigerant in the suction line of the compressor 10 in the internal heat exchanger 14 and, thereafter, the refrigerant is further decompressed by the second decompressor 15. Here, the refrigerant assumes a gas-liquid two-phase state of low temperature and low pressure and is introduced into the second heat exchanger 16. The refrigerant is evaporated due to the heat absorption from indoor air and is subjected to a heat exchange with the refrigerant which flows from the first heat exchanger 13 at the internal heat exchanger 14 thus being subjected to the further heat absorption. Thereafter, the refrigerant is again compressed by the compressor 10.

Figure 9:
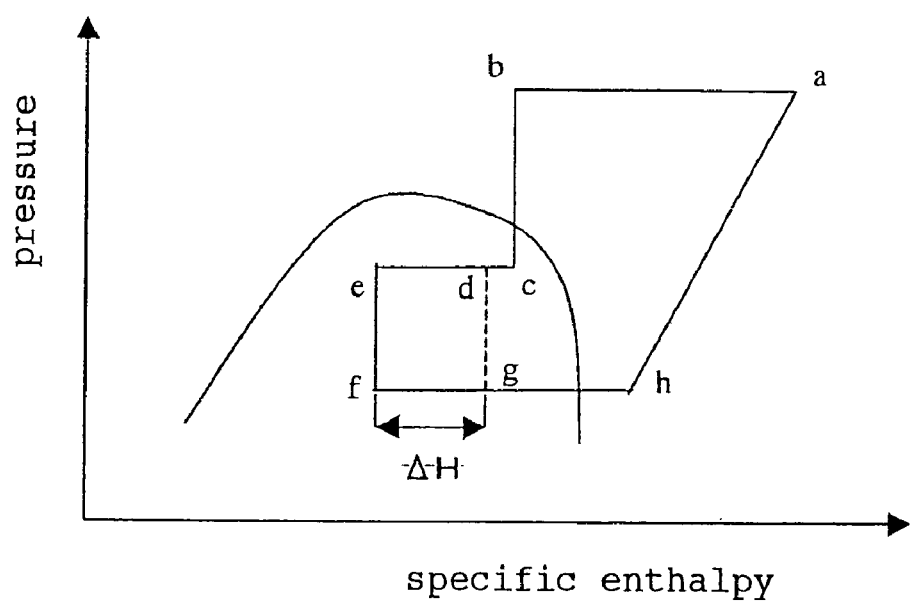
FIG. 9 is a Mollier diagram of the refrigerating cycle device according to the embodiment 6 of the present invention.

Accordingly, as indicated by a Mollier diagram shown in FIG. 9, when the third bypass circuit 26 is provided, a refrigerating cycle which is indicated by a→b→c→d→g→h is established and hence, the refrigerant is hardly subjected to the heat exchange in an intermediate pressure region. To the contrary, when the third bypass circuit 26 is not provided, the first heat exchanger 13 performs a heat radiation action as indicated by a→b→c→e→f→h and hence, a specific enthalpy value of the refrigerant at the inlet of the second heat exchanger 16 is decreased by ΔH. That is, this leads to the increase of a heat absorption quantity of the second heat exchanger 16 which constitutes the indoor-side heat exchanger thus causing lowering of the indoor blow-off temperature.

Accordingly, by providing the third bypass circuit 26, lowering of the indoor blow-off temperature can be prevented whereby it is possible to perform the operation of the refrigerating cycle device with the higher space heating ability.

EMBODIMENT 7

Figure 6:
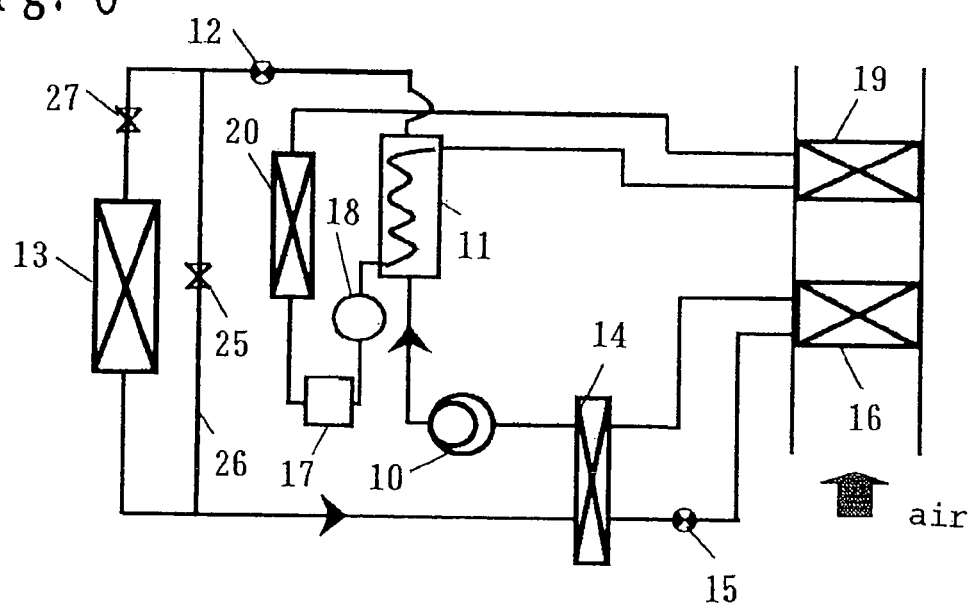
FIG. 6 is a view of a refrigerating cycle device according to an embodiment 7 of the present invention.

FIG. 6 is a constitutional view showing a refrigerating cycle device according to the embodiment 7 of the present invention. Points which make this embodiment different from the embodiment 6 are explained hereinafter. This refrigerating cycle device provides a fourth open/close valve 27 at the inlet of the first heat exchanger 13.

First of all, the manner of operation of the refrigerating cycle device shown in FIG. 6 at the time of space cooling is explained. At the time of space cooling, the second decompressor 15 functions as a decompressor while fully opening the first decompressor 12, fully closing the third open/close valve 25 and fully opening the fourth open/close valve 27. Accordingly, the manner of operation at the time of space cooling is substantially equal to the manner of operation in the embodiment 6 and the substantially equal advantageous effects can be obtained.

Next, the manner of operation at the time of space heating/dehumidifying is explained. At the time of space heating/dehumidifying, the first decompressor 12 and the second decompressor 15 function as a decompressor while fully opening the third open/close valve 25, and fully closing the fourth open/close valve 27.

That is, when the operation is started, the refrigerant which is formed into a gas of high temperature and high pressure by being compressed by the compressor 10 is cooled due to a heat exchange with the cooling water in the water circuit which is circulated by the pump 18 in the refrigerant-water heat exchanger 11. Then, the refrigerant which is cooled by the refrigerant-water heat exchanger 11 is decompressed to an intermediate pressure by the first decompressor 12 and flows into only the third bypass circuit 26.

Accordingly, by preventing the refrigerant from flowing into the first heat exchanger 13 by fully closing the fourth open/close valve 27, it is possible to prevent the occurrence of a phenomenon that due to the change of outdoor temperature, the change of wind speed brought about by the change of vehicle speed and the like, a refrigerant holding quantity and a heat radiation quantity in the first heat exchanger 13 is changed so that controllability becomes difficult.

EMBODIMENT 8

Figure 7:
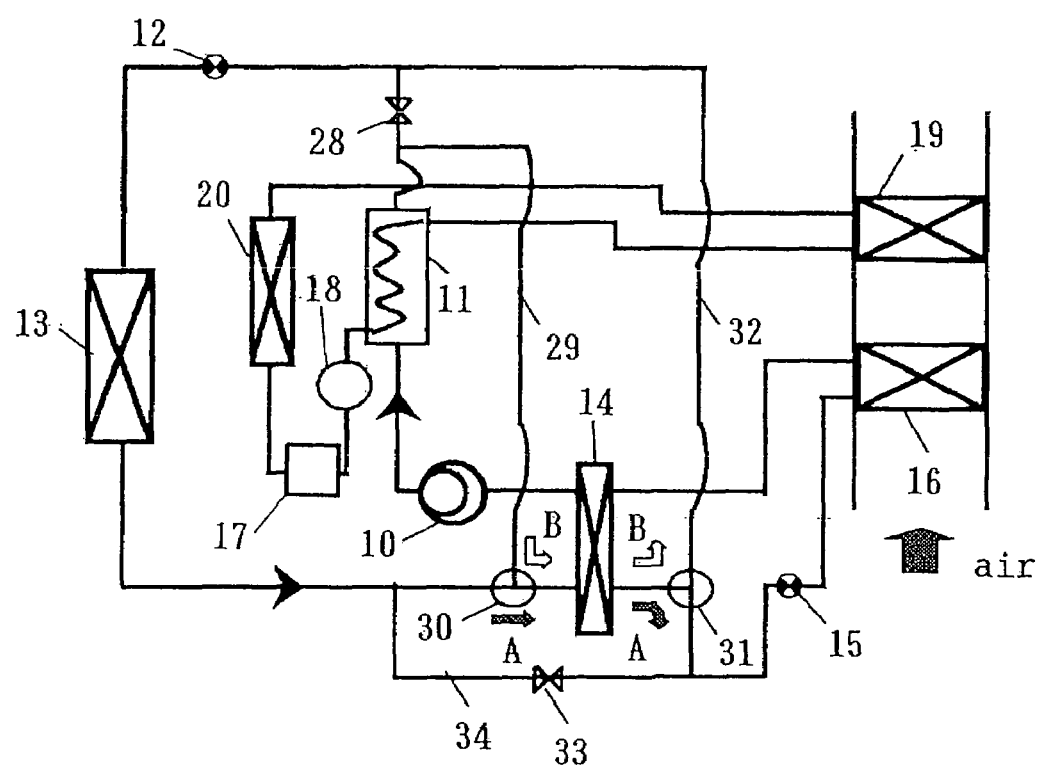
FIG. 7 is a view of a refrigerating cycle device according to an embodiment 8 of the present invention.

FIG. 7 is a view showing a refrigerating cycle device according to the embodiment 8 of the present invention. Points which make this embodiment different from the embodiment 1 are explained hereinafter. This refrigerating cycle device includes a fifth open/close valve 28, a fourth bypass 29, a first three-way valve 30, a second three-way valve 31, a fifth bypass 32, a sixth open/close valve 33 and a sixth bypass 34. The embodiment 8 is characterized by changing over a refrigerant circulation mode between time for starting a compressor and time for steady operation at the time of space heating/dehumidifying.

First of all, the manner of operation of the refrigerating cycle device shown in FIG. 7 at the time of space cooling is explained. At the time of space cooling, the second decompressor 15 functions as a decompressor while fully opening the first decompressor 12, fully opening the fifth open/close valve 28, fully closing the sixth open/close valve 33, controlling the first three-way valve 30 in the direction A and controlling the second three-way valve 31 in the direction A. That is, at the time of space cooling, the manner of operation substantially equal to the manner of operation of the embodiment 1 is performed.

Next, the manners of operations at the time of starting a compressor and at the time of steady operation in the space heating/dehumidifying operation are explained respectively.

At the time of starting a compressor in the space heating/ dehumidifying operation, it is necessary to rapidly enhance the space heating capacity and hence, only the first decompressor 12 functions as a decompressor while fully opening the second decompressor 15, fully closing the fifth open/ close valve 28, fully opening the sixth open/close valve 33, controlling the first three-way valve 30 in the direction B and controlling the second three-way valve 31 in the direction B.

That is, at the time of starting a compressor in the space heating/dehumidifying operation, the refrigerant which is formed into a gas of high temperature and high pressure by being compressed by the compressor 10 is cooled by a heat exchange with the cooling water in the water circuit which is circulated by the pump 18 in the refrigerant-water heat exchanger 11. The heated cooling water flows into the heater core 19 and can further increase the indoor heating capacity at the time of starting the compressor 10. Further, the refrigerant which is cooled by the refrigerant-water heat exchanger 11 flows into the fourth bypass circuit 29 and is subjected to a heat exchange with the refrigerant in the suction line of the compressor 10 by the internal heat exchanger 14 and, thereafter, flows into the fifth bypass circuit 32. Then, the refrigerant is decompressed by the first decompressor 12 and assumes a gas-liquid two-phase state of low temperature and low pressure and is introduced into the first heat exchanger 13. In this first heat exchanger 13, the refrigerant is evaporated due to the heat absorption from the outdoor air and is formed into a gas-liquid two-phase state or a gas. Then, the refrigerant flows into the sixth bypass circuit 34 and is introduced into the second heat exchanger 16 by way of the second decompressor 15. In this second heat exchanger 16, the refrigerant is evaporated due to the heat absorption from the indoor air and is formed into a gas-liquid two-phase or a gas, then is subjected to a heat exchange with the refrigerant which is made to flow out from the first heat exchanger 13 by the internal heat exchanger 14 so that the further heat absorption is performed and, thereafter, the refrigerant is again compressed by the compressor 10.

That is, the operation as a radiator is performed by the refrigerant-water heat exchanger 11 and the heat absorption is performed by the first heat exchanger 13 and the second heat exchanger 16 and hence, it is possible to ensure a further larger heat absorption quantity whereby the space heating capacity can be enhanced.

Here, as described in conjunction with the embodiment 1, although a refrigerant quantity at the time of space heating/dehumidifying assumes the excessively large state when only the first decompressor 12 is operated, by providing the internal heat exchanger 14, the fourth bypass circuit 29 and the fifth bypass circuit 32 between the outlet of the refrigerant-water heat exchanger 11 and the first decompressor 12, the high-pressure side volume can be increased. Accordingly, a refrigerant quantity which is held at the high-pressure side at the time of space heating/dehumidifying is increased and hence, the imbalance of refrigerant quantity between the time of space cooling and the time of space heating/dehumidifying can be alleviated. Further, the suction line of the compressor 10 is subjected to a heat exchange with the high-temperature refrigerant at the outlet of the refrigerant-water heat exchanger 11 and hence, lowering of the suction temperature, that is, lowering of the discharge temperature of the compressor 10 attributed to the excessively large refrigerant quantity can be prevented.

Accordingly, by providing the internal heat exchanger 14, the fourth bypass circuit 29 and the fifth bypass circuit 32 between the outlet of the refrigerant-water heat exchanger 11 and the first decompressor 12, even when only the first decompressor 12 is operated as a decompressor, the imbalance of refrigerant quantity between the time of the space cooling and at the time of space heating/dehumidifying can be alleviated whereby it is possible to ensure the heating capacity at the time of starting the compressor 10.

Next, the manner of operation of the refrigerating cycle device during the steady operation at the time of space heating/dehumidifying is explained.

During the steady operation at the time of space heating/dehumidifying, the first decompressor 12 and the second decompressor 15 are operated as a decompressor while fully opening the fifth open/close valve 28 and fully closing the sixth open/close valve 33, controlling the first three-way valve 30 in the direction A and controlling the second three-way valve 31 in the direction A.

That is, during the steady operation at the time of space heating/dehumidifying, the refrigerant which is formed into a gas of high temperature and high pressure by being compressed by the compressor 10 is cooled by a heat exchange with the cooling water in the water circuit which is circulated by the pump 18 in the refrigerant-water heat exchanger 11 and, thereafter, is decompressed to an intermediate pressure by the first decompressor 12 and is introduced into the first heat exchanger 13. The refrigerant which is cooled by outdoor air in the first heat exchanger 13 is further cooled by a heat exchange with the refrigerant in the suction line of the compressor 10 in the internal heat exchanger 14 and, thereafter, is decompressed by the second decompressor 15 and is introduced into the second heat exchanger 16 in a gas-liquid two-phase state of low temperature and low pressure. In the second heat exchanger 16, the refrigerant is evaporated due to the heat absorption from the indoor air and is formed into a gas-liquid two-phase state or a gas state. Then, the refrigerant is further subjected to the heat absorption by a heat exchange with the refrigerant which flows from the first heat exchanger 13 in the internal heat exchanger 14 and, thereafter, is again compressed by the compressor 10. In this manner, during the steady operation at the time of space heating/dehumidifying, the manner of operation substantially equal to the manner of operation of the embodiment 1 is performed.

As described above, in the embodiment 8, by providing the fourth bypass circuit 29 and the fifth bypass circuit 32, at the time of starting the space heating/dehumidifying and during the steady operation, it is possible to alleviate the imbalance of the refrigerant quantity and hence, the refrigerating cycle device can be operated with high efficiency at the time of space cooling and at the time of space heating/dehumidifying respectively while minimizing the receiver or without providing the receiver.

As can be clearly understood from the above explanation, according to this embodiment, in the refrigerating cycle device which uses carbon dioxide as the refrigerant, by changing the refrigerant holding quantity in the first heat exchanger 13 to the intermediate pressure by operating the first decompressor 12 and the second decompressor 15, it is possible to alleviate the imbalance of the refrigerant quantity between the time for space heating and the time for space heating/dehumidifying and hence, the refrigerant cycle device can be operated with high efficiency while miniaturizing the receiver or without providing the receiver.

Further, even when the refrigerating cycle is largely changed such as the change of an ambient temperature or the change of a rotational speed of the compressor, it is possible to alleviate the imbalance of refrigerant quantity between time for space cooling and time for space heating/dehumidifying by controlling the second decompressor 15 and hence, it is possible to perform the highly-efficient operation of the refrigerating cycle device with versatility by miniaturizing the receiver or without the receiver.

Further, by providing the first bypass circuit 22, the reduction of the pressure loss of the refrigerant-water heat exchanger 11 at the time of space cooling can be achieved and hence, it is possible to perform the operation of the refrigerating cycle device with higher efficiency.

Further, by controlling the first decompressor 12 or the first open/close valve 21 using the value detected by the first heat exchanger temperature detection means 36, it is possible to prevent the frost at the time of space heating/dehumidifying and hence, it is possible to perform the operation of the refrigerating cycle device with higher efficiency and high comfortableness.

Further, by providing the second bypass circuit 24, at the time of space heating or humidifying, the start-up performance of the indoor heating capacity immediately after starting the operation of the compressor 10 can be enhanced and hence, it is possible to perform the operation of the refrigerating cycle device with the excellent rapid heating ability.

Further, by providing the third bypass circuit 26, lowering of the indoor blow-off temperature can be prevented and hence, it is possible to perform the operation of the refrigerating cycle device with the higher heating ability.

Further, by preventing the flow of the refrigerant into the first heat exchanger 13 by fully closing the fourth close valve 27, it is possible to prevent the occurrence of a phenomenon that due to the change of outdoor temperature or the like, a refrigerant holding quantity and a heat radiation quantity in the first heat exchanger 13 are changed so that controllability becomes difficult.

Further, by providing the fourth bypass circuit 29 and the fifth bypass circuit 32, at the time of starting the space heating/dehumidifying and during the steady operation, it is possible to alleviate the imbalance of the refrigerant quantity and hence, the refrigerant cycle device can be operated with high efficiency at the time of space cooling and at the time of space heating/dehumidifying respectively while miniaturizing the receiver or without providing the receiver.

EMBODIMENT 9

Figure 10:
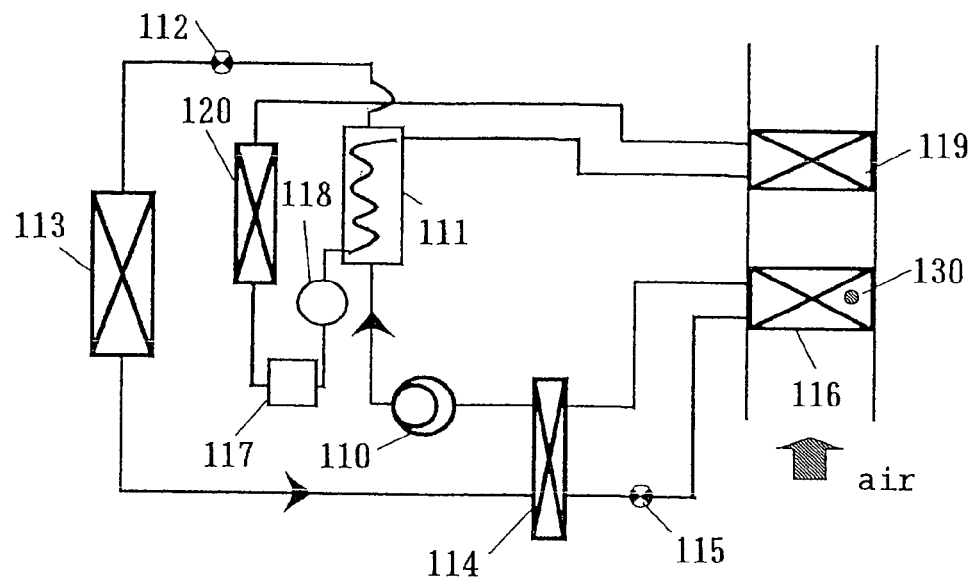
FIG. 10 is a view of a refrigerating cycle device according to an embodiment 9 of the present invention.

FIG. 10 is a constitutional view showing a refrigerating cycle device according to embodiment 9 of the present invention. The refrigerating cycle uses a $CO_2$ refrigerant as a working liquid and adopts a compressor 110, a refrigerant-water heat exchanger 111, a first decompressor 112, a first heat exchanger 113, an internal heat exchanger 114, a second decompressor 115 and a second heat exchanger 116 as basic constitutional elements thereof. An outlet line of the first heat exchanger 113 and a suction line of the compressor 110 which is arranged at an outlet of the second heat exchanger 116 are subjected to a heat exchange by the internal heat exchanger 114. On the other hand, the hot water cycle is constituted of a pump 118 which circulates hot water heated by the refrigerant-water heat exchanger 111, a heater core 119, a radiator 120 and a power engine 117.

The refrigerating cycle device of this embodiment constitutes an example of a dehumidifying device of the present invention.

Here, the operation of the refrigerating cycle device shown in FIG. 10 at the time of space cooling is explained.

First of all, at the time of space cooling, the first decompressor 112 is fully opened and the second decompressor 115 performs an operation as a decompressor. That is, the refrigerant which is formed into a gas of high temperature and high pressure by being compressed by the compressor 110 passes through the first decompressor 112 from the refrigerant-water heat exchanger 111 and is cooled by outdoor air by the first heat exchanger 113. However, since space heating is not performed by the heater core 119, hot water is not made to flow into the refrigerant-water heat exchanger 111. Then, the refrigerant is subjected to a heat exchange with a refrigerant in a suction line of the compressor 110 at the internal heat exchanger 114 to be further cooled. Thereafter, the refrigerant is decompressed by the second decompressor 115 and assumes a gas-liquid two-phase state of low temperature and low pressure and is introduced into the second heat exchanger 116. In this second heat exchanger 116, the refrigerant is evaporated due to heat absorption from indoor air and is formed into a gas-liquid two-phase state or a gas state, then is subjected to further heat absorption by a heat exchange with a refrigerant flown from the first heat exchanger 113 at the internal heat exchanger 114 and, thereafter, the refrigerant is compressed again by the compressor 110. Air is cooled by the second heat exchanger 116.

Next, the operation at the time of space heating/dehumidifying is explained.

At the time of space heating/dehumidifying, the first decompressor 112 and the second decompressor 115 perform an operation as a decompressor.

That is, the refrigerant which is formed into a gas of high temperature and high pressure by being compressed by the compressor 110 is cooled by being subjected to a heat exchange with hot water in a hot water cycle which is circulated by a pump 118 at the refrigerant-water heat exchanger 111 and, thereafter, is decompressed to an intermediate pressure by the first decompressor 112 and is introduced into the first heat exchanger 113.

The refrigerant which is cooled by outdoor air in the first heat exchanger 113 is subjected to a heat exchange with the refrigerant in the suction line of the compressor 110 at the internal heat exchanger 114 and hence, the refrigerant is further cooled. Thereafter, the refrigerant is decompressed by the second decompressor 115 and assumes a gas-liquid two-phase state of low temperature and low pressure and is introduced into the second heat exchanger 116. In this second heat exchanger 116, the refrigerant is evaporated due to heat absorption from indoor air and is formed into a gas-liquid two-phase state or a gas state, then is subjected to further heat absorption by a heat exchange with the refrigerant flown from the first heat exchanger 113 at the internal heat exchanger 114 and, thereafter, the refrigerant is again compressed by the compressor 110.

Further, the hot water which is heated by the refrigerant-water heat exchanger 111 flows into the heater core 119 installed in a room and heats the air which is cooled and dehumidified by the second heat exchanger 116 whereby the space heating can be performed while performing the space dehumidifying. Then, the hot water is heated by the power engine 117 (for example, a heat generating source such as an engine or a battery) and is again made to flow in the refrigerant-water heat exchanger 111.

Figure 21:
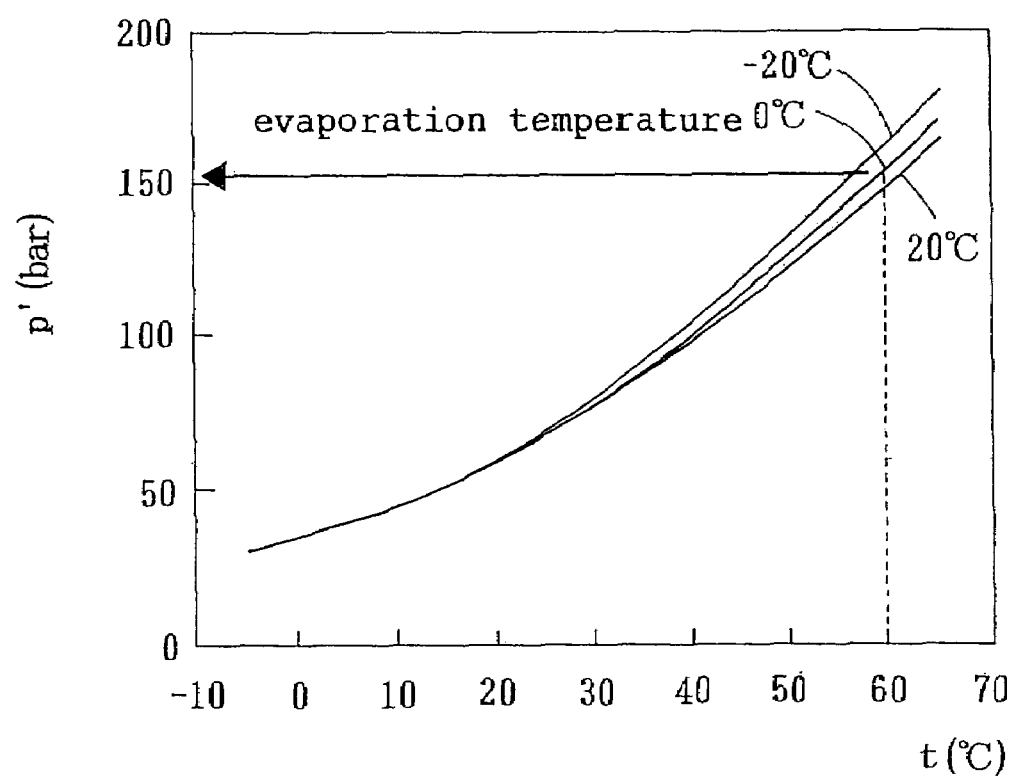
FIG. 21 is a graph showing the relationship between a radiator outlet temperature and a high-side pressure when the conventional refrigerating cycle device assumes an optimum COP.

FIG. 21 is a graph showing the logical relationship between an optimum high-side pressure which makes COP have the maximum value and refrigerant temperature at the outlet of a radiator using three different evaporation temperatures as parameters. Here, assuming the heating capacity of the refrigerant-water heat exchanger 111 as 1.5 kW, the inlet refrigerant temperature of the refrigerant-water heat exchanger 111 as 120° C., the refrigerant flow rate as 60 kg/h and the evaporation temperature as 0° C. at the time of space heating/dehumidifying, it is considered that the outlet refrigerant temperature of the refrigerant-water heat exchanger 111 approximates 60° C. and the high-side pressure value which becomes the minimum energy in such a case is calculated as approximately 150 bar as shown in FIG. 21, using a set value of a conventional example. In this manner, according to the conventional example, the value of the high-side pressure is set higher at the time of heating or dehumidifying than at the time of cooling.

However, when the refrigerating cycle device is operated at such a high pressure, the compression ratio is increased and hence, the efficiency of the compressor 110 is largely lowered and it is estimated that an actual energy consumption cannot be minimized.

In the embodiment 9 of the present invention, by setting the pressure of the refrigerant in the first heat exchanger 113 to the intermediate pressure with the use of the first decompressor 112, the operation of the refrigerating cycle device at such a high pressure can be obviated.

Figure 15:
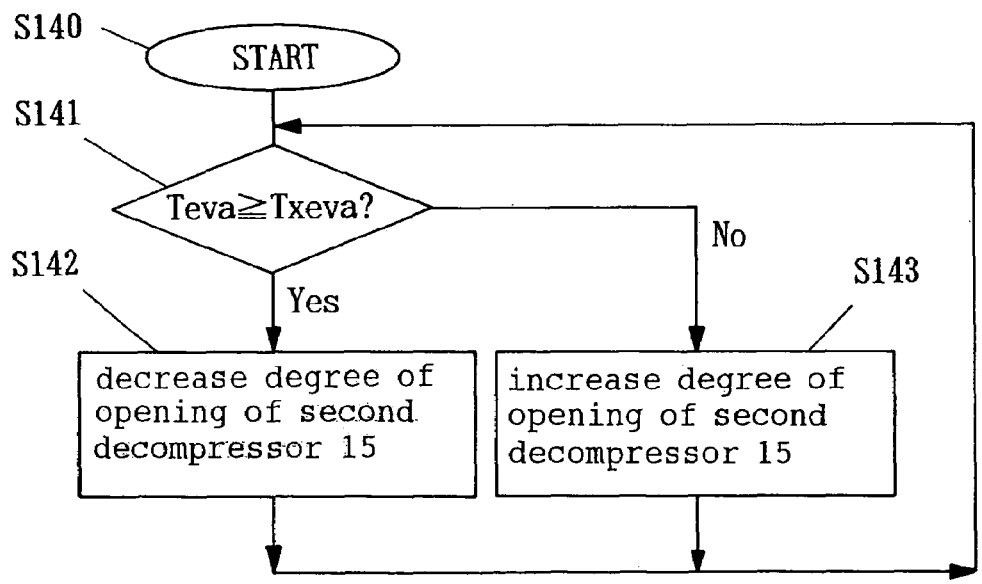
FIG. 15 is a control flow chart of a refrigerating cycle device according to an embodiment 9 of the present invention.

Then, with respect to the embodiment 9 of the present invention, the operation of the second decompressor 115 at the time of space heating/dehumidifying in the refrigerating cycle device shown in FIG. 10 is explained using a flow chart shown in FIG. 15. The second decompressor 115 is a valve which is capable of performing flow rate adjustment.

At the time of space heating/dehumidifying, in step 141, a refrigerant temperature Teva detected by second heat exchanger refrigerant temperature detection means 130 and a target set temperature Txeva (for example, a dew point temperature: 0° C.) are compared. Then, when Teva is equal to or more than Txeva, this implies that dehumidifying is not performed at the second heat exchanger 116 which constitutes the indoor-side heat exchanger. In this case, the processing advances to step 142 and a control is performed to decrease the degree of opening of the second decompressor 115.

Although it is not necessary to control the degree of opening of the first decompressor 112, it is possible to perform a control to increase the degree of opening. By performing such a control, an intermediate pressure in the first heat exchanger 113 is increased and hence, the refrigerant temperature in the first heat exchanger 113 is elevated. Accordingly, the temperature difference between the low-pressure side and the high-pressure side which are served for a heat exchange in the internal heat exchanger 114 becomes large and hence, an internal heat exchange quantity is increased. After controlling the second decompressor 115, the processing returns to step 140.

Figure 14:
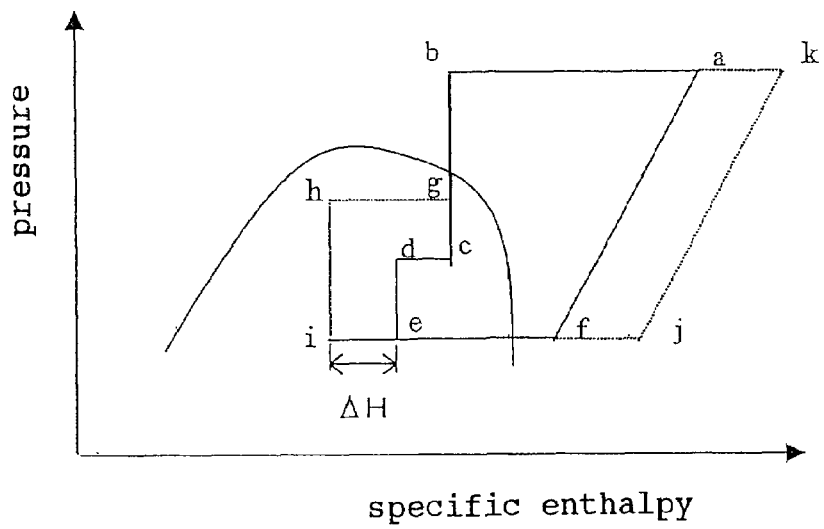
FIG. 14 is a Mollier diagram of the refrigerating cycle device according to the embodiment 9 of the present invention.

Accordingly, as indicated by the Mollier diagram shown in FIG. 14, although the refrigerating cycle indicated by a→b→c→d→e→f is made before the second decompressor 115 is operated, when the degree of opening of the second decompressor 115 is made small, a heat exchange quantity in the internal heat exchanger 114 is increased as indicated by k→b→g→h→i→j and hence, a specific enthalpy value of an inlet refrigerant of the second heat exchanger 116 is decreased by ΔH.

Accordingly, the enthalpy difference of the second heat exchanger 116 is increased and hence, the refrigerating cycle is balanced such that the heat absorbing capacity is increased and the evaporation temperature of the second heat exchanger 116 is lowered whereby the dehumidifying can be realized.

Accordingly, there is no possibility that the high pressure is increased and hence, the heat absorbing capacity of the second heat exchanger 116 can be increased without largely lowering the efficiency of the compressor.

Further, when Teva is smaller than Tevax, this implies a state in which the dehumidifying is performed by the second heat exchanger 116 which constitutes an indoor-side heat exchanger. Then, the processing advances to step 43 in which a control is made so as to increase the degree of opening of the second decompressor 115.

Here, although it is unnecessary to control the degree of opening of the first decompressor 112, a control may be made so as to decrease the degree of opening. Due to such a control, by lowering an intermediate pressure in the first heat exchanger 113 thus lowering the refrigerant temperature in the first heat exchanger 113, the temperature difference between the low pressure side and the high pressure side where a heat exchange is made in the internal heat exchanger 114 is small and hence, an internal heat exchange quantity is lowered whereby excessive lowering of a blow-off temperature can be prevented. Then, the processing advances to step 141 after controlling the second decompressor 115.

In this manner, at the time of space heating/dehumidifying, the inside of the first heat exchanger 113 is set to an intermediate pressure by operating the first decompressor 112 or the second decompressor 115 so as to adjust the refrigerant temperature in the first heat exchanger 113 whereby a heat exchange quantity of the internal heat exchanger 114 can be adjusted. Accordingly, it is possible to perform the operation of the refrigerating cycle device with high efficiency by ensuring the reliability while eliminating the imbalance of an optimum refrigerant quantity between time for space cooling and time for space heating/dehumidifying with energy consumption smaller than energy consumption necessary for the operation of a conventional example without setting pressure to the high-side pressure which constitutes the minimum energy calculated by the conventional example.

EMBODIMENT 10

Figure 11:
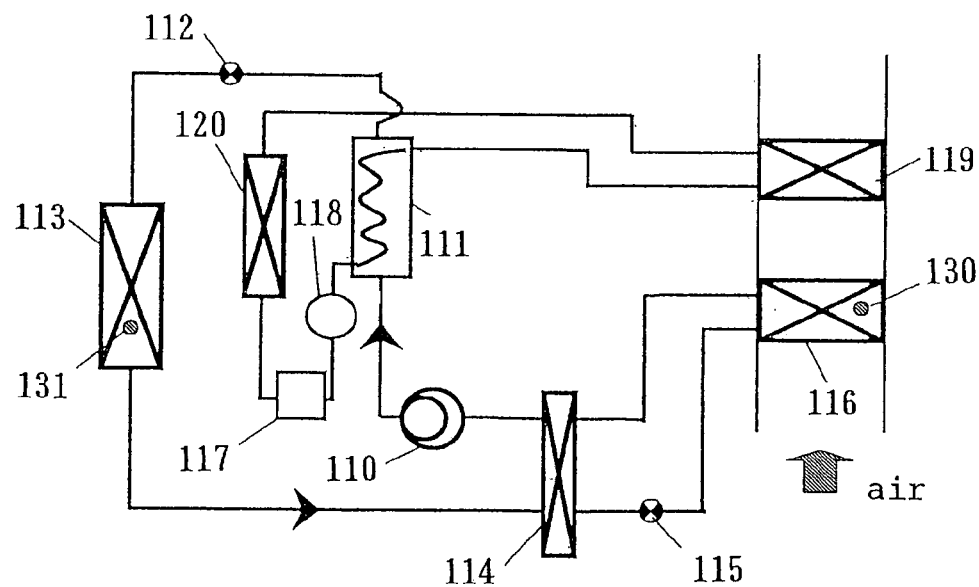
FIG. 11 is a view of a refrigerating cycle device according to an embodiment 10 of the present invention.
Figure 16:
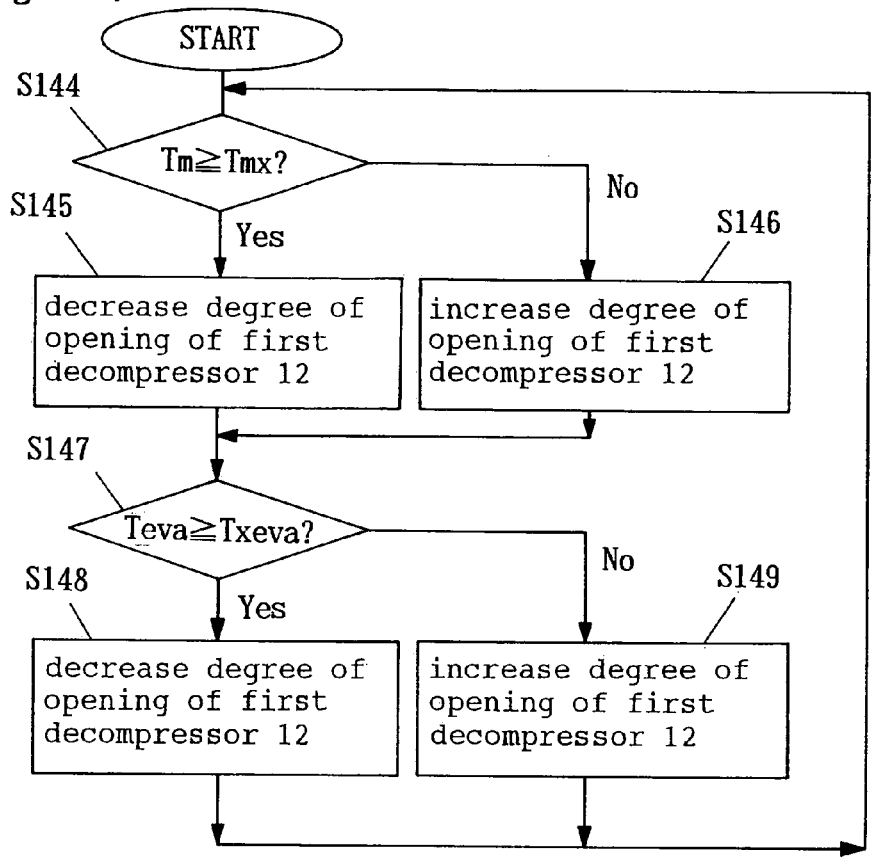
FIG. 16 is a control flow chart of a refrigerating cycle device according to an embodiment 10 of the present invention.

With respect to the embodiment 10 of the present invention, the manner of operation of the first decompressor 112 and the second decompressor 115 at the time of space heating/dehumidifying in a refrigerating cycle device shown in FIG. 11 is explained using a flow chart shown in FIG. 16. Points which make this embodiment different from the embodiment 9 are explained hereinafter. The first decompressor 112 is a valve which is capable of adjusting a flow rate.

A refrigerant holding quantity at the high pressure side of the refrigerating cycle device differs between time for space heating/dehumidifying and time for space cooling and hence, an imbalance is generated with respect to an optimum refrigerant quantity. Accordingly, by adjusting the refrigerant holding quantity in the first heat exchanger 113 by changing an intermediate pressure, it is possible to eliminate the imbalance of the refrigerant quantity between time for space cooling and time of space heating/dehumidifying.

At the time of space heating/dehumidifying, in step 144, a refrigerant temperature Tm which is detected by first heat exchanger refrigerant temperature detection means 131 and a target set temperature Txm (for example, 20° C.) are compared. This Txm value is a value which is set such that the optimum refrigerant quantity which ensures the highest efficiency is obtained at the time of space heating/dehumidifying. Then, when Tm is equal to or more than Txm, this implies a state that an intermediate pressure of the first heat exchanger 113 is higher than the set value and the circulating refrigerant quantity is lower than the optimum value. Accordingly, processing advances to step 145 so as to perform a control which decreases the degree of opening of the first decompressor 112. In this manner, by lowering the refrigerant holding quantity in the first heat exchanger 113 by lowering the intermediate pressure in the first heat exchanger 113, it is possible to operate the refrigerating cycle device with the optimum refrigerant quantity at the time of space heating/dehumidifying.

Further, when Tm is smaller than Txm, this implies a state that the intermediate pressure of the first heat exchanger 113 is lower than a set value and the circulating refrigerant quantity is higher than the optimum value and hence, processing advances to step 146 in which a control is performed so as to increase the degree of opening of the first decompressor 112. Due to such a constitution, by increasing the refrigerant holding quantity in the first heat exchanger 113 by increasing the intermediate pressure in the first heat exchanger 113, it is possible to operate the refrigerating cycle device with the optimum refrigerant quantity at the time of space heating/dehumidifying.

After completion of the above-mentioned step 145 and step 146, the processing advances to step 147 in which the refrigerant temperature Teva which is detected by the second heat exchanger refrigerant temperature detection means 130 and the target set temperature Txeva (for example, a dew point temperature: 0° C.) are compared with each other. The subsequent operations are substantially equal to the operation of the above-mentioned embodiment 9.

As described above, by changing an intermediate pressure in the first heat exchanger 113 by operating the first decompressor 112 and the second decompressor 116, the refrigerant holding quantity in the first heat exchanger 113 can be adjusted and hence, it is possible to perform the operation of the refrigerating cycle device with the optimum refrigerant quantity without providing a receiver for adjusting the refrigerant at the time of space heating/dehumidifying.

Further, when the degree of opening of the second decompressor 115 is adjusted positively as described in the embodiment 9, the dryness of the absorbed refrigerant in the compressor is largely fluctuated and hence, a capacity control of the refrigerating cycle device becomes difficult.

However, by adjusting the degree of opening of the first decompressor 112 and the second decompressor 115 as described above, such a drawback can be alleviated and hence, it is possible to perform more stable operation of the refrigerating cycle device.

EMBODIMENT 11

Figure 12:
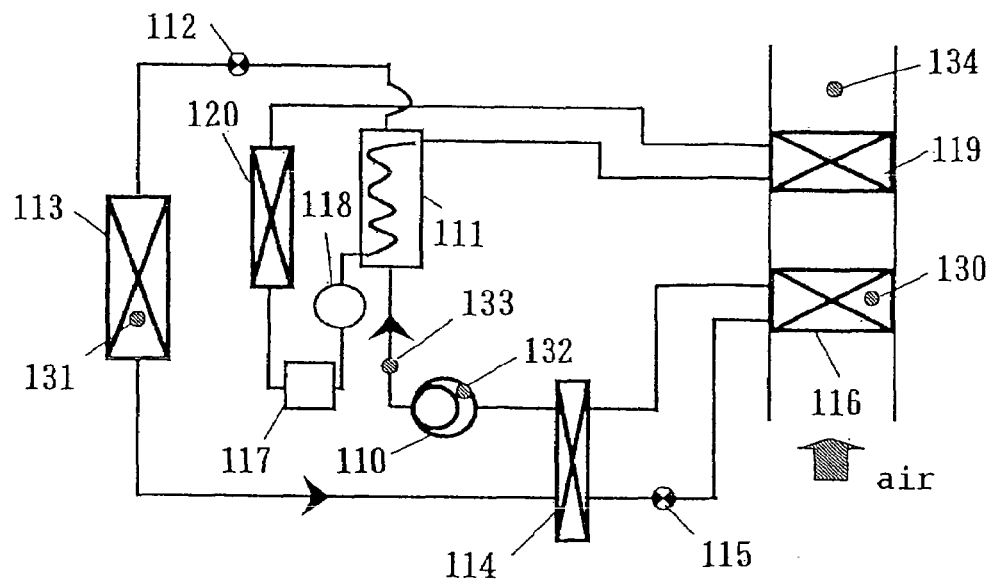
FIG. 12 is a view of a refrigerating cycle device according to an embodiment 11 of the present invention.
Figure 18:
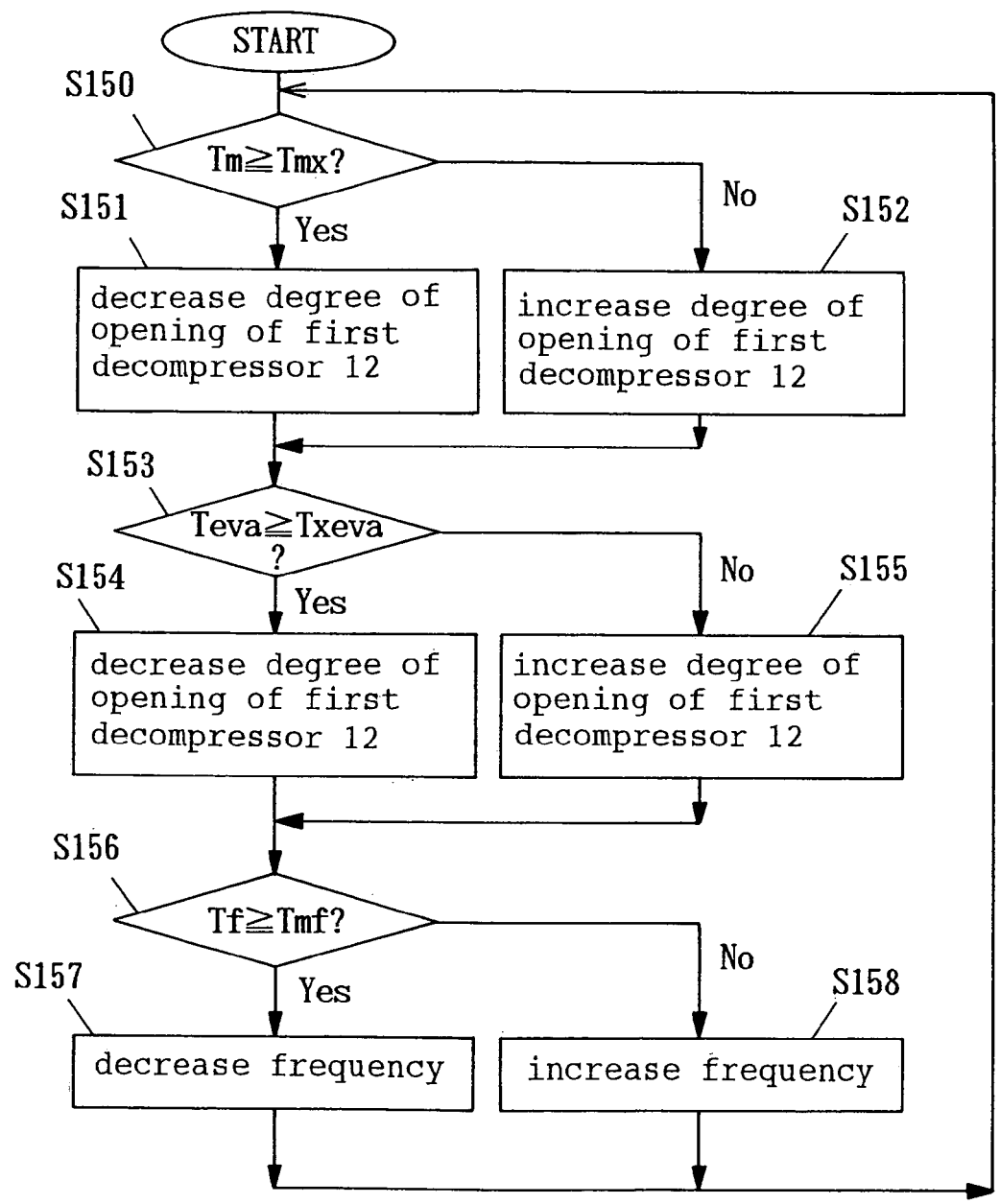
FIG. 18 is a control flow chart of a refrigerating cycle device according to an embodiment 12 of the present invention.
Figure 19:
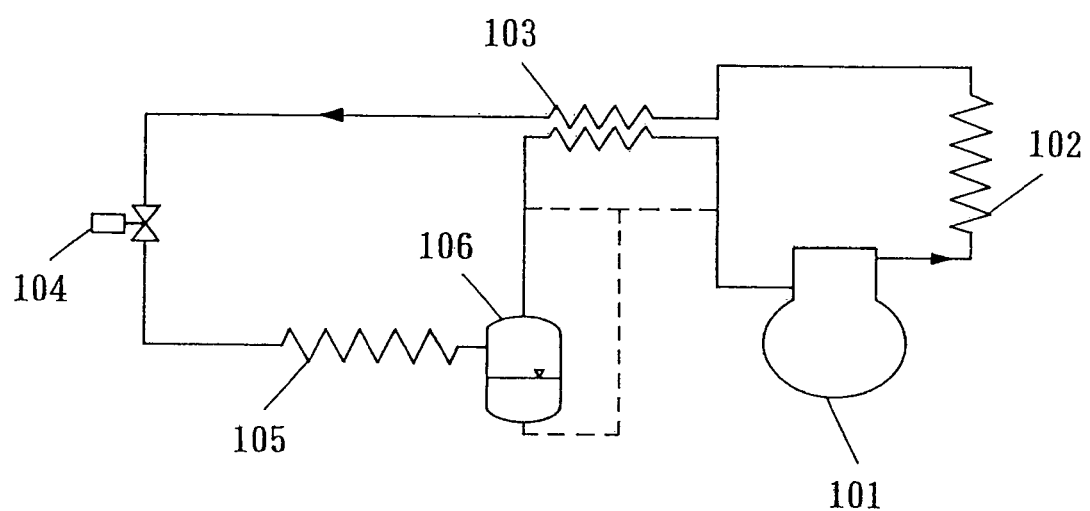
FIG. 19 is a view of a conventional refrigerating cycle device.
Figure 20:
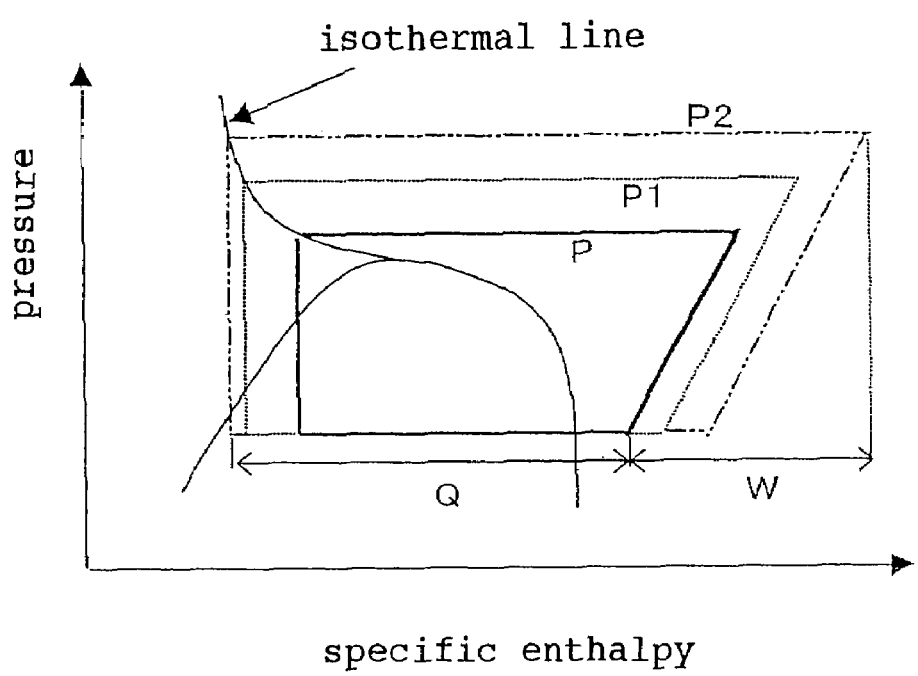
FIG. 20 is a Mollier diagram of the conventional refrigerating cycle device.

With respect to the embodiment 11 of the present invention, the manner of operation of the first decompressor 112 and the second decompressor 115 at the time of space heating/dehumidifying in a refrigerating cycle device shown in FIG. 12 is explained using a flow chart shown in FIG. 18. Points which make this embodiment different from the embodiment 9 are explained hereinafter. The refrigerating cycle device includes blow-off temperature detection means 134 which detects a temperature of blow-off air which is blown off by way of the heater core 119 and compressor operation frequency control means 132 which controls an operation frequency of the compressor 110.

At the time of space heating/dehumidifying, a refrigerant temperature Tm which is detected by the first heat exchanger refrigerant temperature detection means 131 and a target set temperature Txm (for example 20° C.) are compared in step 150. The subsequent operations are substantially equal to the operation of the above-mentioned embodiment 10, wherein steps 144 to 149 respectively correspond to steps 150 to 155.

Then, the processing advances from step 154 or step 155 to step 156 in which a blow-off temperature Tf which is detected by blow-off temperature detection means 134 and a target set temperature Txf (for example 40° C.) are compared with each other. The value of Txf is a value of a blow-off temperature required at the time of space heating/dehumidifying. Then, when Tf is equal to or more than Txf, since the blow-off temperature Tf is higher than the target set temperature Txf, this implies that the heating capacity is high. Accordingly, the processing advances to step 157 in which a control is performed so as to decrease the operation frequency of the compressor 110. Thereafter, the processing returns to step 150.

Further, when Tf is smaller than Txf, since the blow-off temperature Tf is lower than the target set temperature Txf, this implies that the heating capacity is low. Accordingly, the processing advances to step 158 in which a control is performed so as to increase the operation frequency of the compressor 110. Thereafter, the processing returns to step 150.

As described above, the heating capacity can be adjusted by changing the operation frequency of the compressor 110 and hence, it is possible to operate the refrigerating cycle device with the optimum refrigerant quantity without deteriorating the comfortableness.

EMBODIMENT 12

Figure 13:
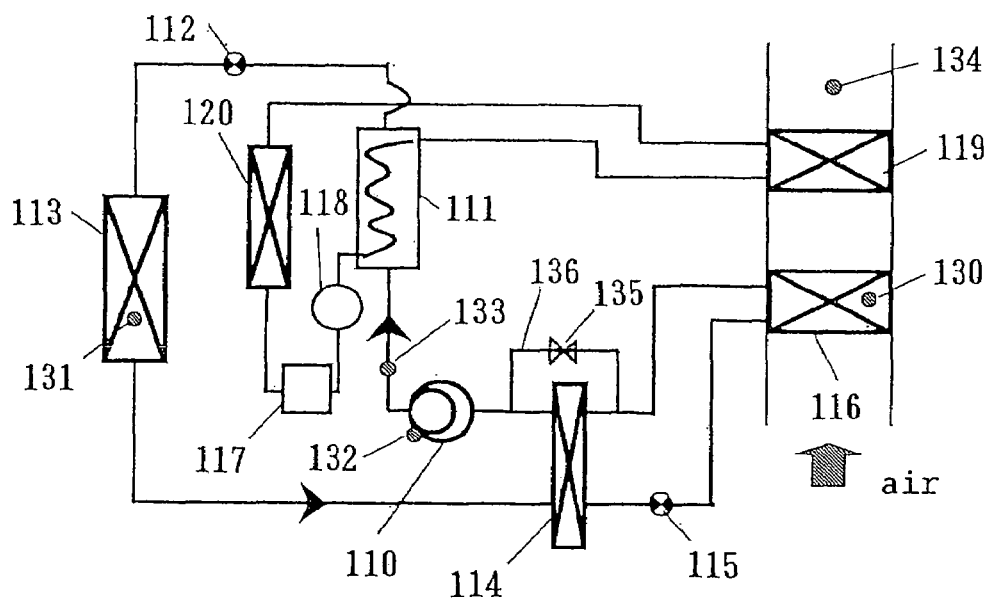
FIG. 13 is a view of a refrigerating cycle device according to an embodiment 12 of the present invention.
Figure 17:
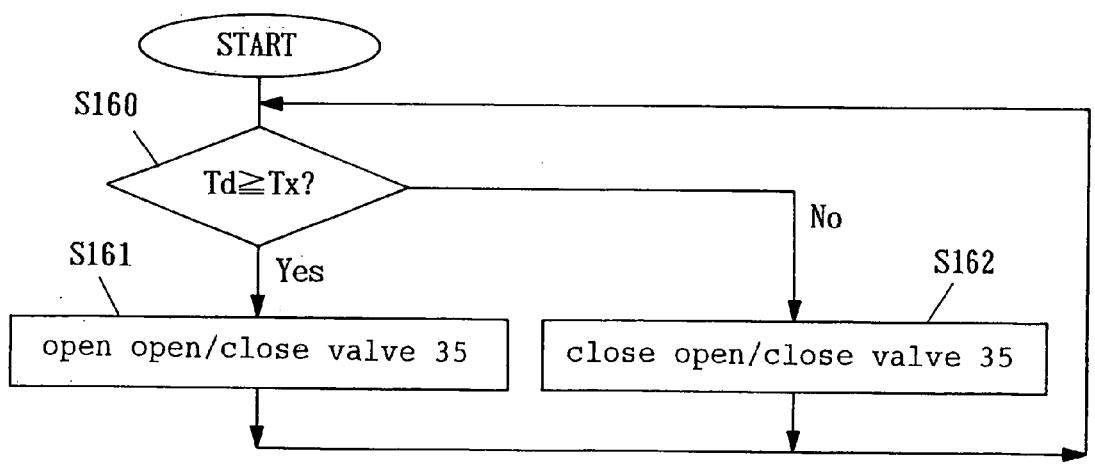
FIG. 17 is a control flow chart of a refrigerating cycle device according to an embodiment 11 of the present invention.

FIG. 13 is a constitutional view showing a refrigerating cycle device according to the embodiment 12 of the present invention. Points which make this embodiment different from the embodiment 9 are explained hereinafter. This refrigerating cycle device includes discharge refrigerant temperature detection means 133 which detects a discharge refrigerant temperature of a compressor 110 and a bypass circuit 136 which bypasses an outlet of a second heat exchanger 116 and an inlet of a compressor 110 by way of an open/close valve 135. The manner of operation of the open/close valve 135 at the time of space heating/dehumidifying operation in the refrigerating cycle device shown in FIG. 13 is explained using a flow chart shown in FIG. 17.

At the time of space heating/dehumidifying, the discharge refrigerant temperature Td detected by the discharge refrigerant temperature detection means 133 and a target set temperature Tx (for example, 140° C.) are compared with each other in step 160. Here, the target set temperature is set to a value which is close to an upper limit temperature within a use range of the compressor 110. Then, when Td is equal to or more than Tx, this implies a state in which Td exceeds the upper limit temperature within the use range of the compressor 110 and the processing advances to step 161 in which a control is performed so as to open the degree of opening of a release valve 135. Due to such a control, the refrigerant which flows out from the second heat exchanger 116 flows into the bypass circuit 136 and hence, an internal heat exchange quantity in the internal heat exchanger 114 is decreased, an absorption refrigerant temperature of the compressor 110 is lowered, and the discharge refrigerant temperature is also lowered. After controlling the release valve 135, the processing returns to step 160.

Further, when Td is smaller than Tx, this implies a state in which Td is lower than the upper limit temperature within the use range of the compressor 110 and the processing advances to step 162 in which a control is performed so as to close the opening degree of the release valve 135. Thereafter, the processing returns to step 160.

In this manner, by controlling the release valve 135, it is possible to prevent the excessive elevation of the discharge temperature of the compressor 110 without lowering the operation frequency of the compressor and hence, it is possible to perform the operation of the refrigerating cycle device with high comfortableness and with high efficiency.

EMBODIMENT 13

The embodiment 13 of the present invention is characterized in that the refrigerating cycle device is an air conditioner for a vehicle. Here, when only a refrigerant-water heat exchanger 111 is operated as a radiator (for example, at the time of performing a start-up operation or the like), an outdoor-side heat exchanger, that is, a first heat exchanger 113 is operated as an evaporator. However, in case of the air conditioner for a vehicle, the first heat exchanger 113 receives an oncoming wind during traveling of the vehicle. Accordingly, when a temperature of the refrigerant which flows in the first heat exchanger 113 becomes 0° C. or less and a frost is generated, even when the first heat exchanger 113 is operated as a radiator by performing the reverse cycle operation, the refrigerant temperature is difficult to elevate and hence, it is extremely difficult to perform defrosting rapidly and completely.

Accordingly, by setting the pressure in the first heat exchanger 113 to an intermediate pressure by operating the first decompressor 112 or the second decompressor 115 so as to adjust a refrigerant temperature of the first heat exchanger 113 as described in the embodiment 9, it is possible to prevent the generation of the frost in the first heat exchanger 113 in advance whereby it is also possible to perform the operation of the refrigerating cycle device with high comfortableness and with high efficiency with respect to the air conditioner for a vehicle.

As can be clearly understood from the foregoing explanation, according to this embodiment, by setting the pressure in the first heat exchanger 113 to an intermediate pressure by operating the first decompressor 112 or the second decompressor 115 so as to adjust the refrigerant temperature of the first heat exchanger 113, it is possible to adjust a heat exchange quantity of the internal heat exchanger 114. Accordingly, it is possible to perform the operation of the refrigerating cycle device with high efficiency, while ensuring the reliability, with energy consumption smaller than energy consumption necessary for a conventional example without setting pressure to the high-side pressure which constitutes the minimum energy calculated by the conventional example.

Further, it is possible to adjust a refrigerant holding quantity in the first heat exchanger 113 in such a manner that the intermediate pressure in the first heat exchanger 113 is changed by operating the first decompressor 112 and the second decompressor 115 and hence, it is possible to operate the refrigerating cycle device with the optimum refrigerant quantity without providing a receiver for adjusting the refrigerant at the time of space heating/dehumidifying.

Further, by changing the operation frequency of the compressor 110 by operating the first decompressor 112 and the second decompressor 115, the space heating capacity can be adjusted and hence, it is possible to operate the refrigerating cycle device with an optimum refrigerant quantity without deteriorating comfortableness.

Further, by controlling the release valve 135, it is possible to prevent the excessive elevation of the discharge temperature of the compressor 110 without lowering the operation frequency of the compressor and hence, it is possible to operate the refrigerating cycle device with high comfortableness and with high efficiency.

Further, by controlling the refrigerant temperature of the first heat exchanger 113 in such a manner that the pressure in the first heat exchanger 113 is set to the intermediate pressure by operating the first decompressor 112 or the second decompressor 115, it is possible to prevent the generation of the frost in the first heat exchanger 113 in advance whereby it is possible to perform the operation of the refrigerating cycle device with high comfortableness and with high efficiency also with respect to the air conditioner for a vehicle.

As can be clearly understood from the foregoing explanation, the present invention can provide the refrigerating cycle devices and the operating methods of the refrigerating cycle device which enable the efficient operation, while ensuring the reliability, with a miniaturized low-pressure receiver or without using a low-pressure receiver by making use of features of the $CO_2$ refrigerating system in a refrigerating cycle device using $CO_2$ refrigerant.

Further, the present invention can provide the dehumidifying device and the operating of the dehumidifying method which enable the efficient operation while ensuring the reliability and eliminating an imbalance of an optimum refrigerant quantity between time for space cooling and time for space heating/dehumidifying by adjusting intermediate pressure without increasing the high-side pressure by making use of the features of the $CO_2$ refrigerating system in the dehumidifying device using the $CO_2$ refrigerant.

The invention claimed is:

1. A refrigerating cycle device comprising: a refrigerating cycle subsystem including:
   a compressor that compresses a refrigerant which contains carbon dioxide,
   a refrigerant-water heat exchanger that performs a refrigerant-water heat exchange between water and the refrigerant compressed by the compressor,
   a first decompressor configured to decompress the compressed refrigerant passed through said refrigerant-water heat exchanger,
   a first heat exchanger that performs a first heat exchange between the refrigerant passed through said first decompressor and first air,
   an internal heat exchanger that performs an internal heat exchange between the refrigerant passed through said first heat exchanger and the refrigerant subjected to a second heat exchange, said compressor receiving the refrigerant passed from an outlet of said internal heat exchange,
   a second decompressor that decompresses the refrigerant passed from a further outlet of the internal heat exchanger, and
   a second heat exchanger that performs the second heat exchange between the refrigerant decompressed by the second decompressor and second air, said second air different from said first air.
   said refrigerating cycle subsystem providing a refrigerating cycle for said refrigerant by sequentially connecting said compressor, said refrigerant-water heat exchanger, said first decompressor, said first heat exchanger, said internal heat exchanger, said second decompressor, said second heat exchanger, and said internal heat exchanger, and
   a water cycle subsystem including:
   a power engine that heats the water,
   the refrigerant-water heat exchanger, the refrigerant-water heat exchanger receiving the water heated by the power engine,
   a heater core that receives the water passed through the refrigerant-water heat exchanger, said heater core arranged downstream of and in proximity to the second heat exchanger to receive the second air modified by flow through said second heat exchanger, and
   a radiator, separate from said heater core, that receives the water passed through said heater core and passes the water to said power engine,
   said water cycle subsystem providing a water cycle for the water by sequentially connecting said power engine, said refrigerant-water heat exchanger, said heater core and said radiator,
   wherein an air conditioning capacity is adjusted by adjusting a degree of an opening of the second decompressor at a time of heating and dehumidifying.

2. A refrigerating cycle device according to claim 1, wherein during the adjustment of the degree of the opening of the second decompressor at the time of heating and dehumidifying, a discharge temperature of the compressor is detected, the detected discharge temperature and a set discharge temperature are compared, and the degree of the opening of the second decompressor is increased when the detected discharge temperature is equal to or more than the set discharge temperature and is decreased when the detected discharge temperature is less than the set discharge temperature.

3. A refrigerating cycle device according to claim 1, wherein said refrigerating cycle device comprises a third bypass circuit which connects an inlet and an outlet of the first heat exchanger by way of a third open/close valve.

4. A refrigerating cycle device according to claim 1, wherein said refrigerating cycle device comprises a fourth open/close valve at an inlet of said first heat exchanger.

5. A refrigerating cycle device according to claim 1, wherein said refrigerating cycle device comprises:
   a fifth open/close valve which is disposed between an outlet of said refrigerant-water heat exchanger and said first decompressor;

a first three-way valve which is disposed between an outlet of said first heat exchanger and an inlet of said internal heat exchanger;

a fourth bypass circuit which is connected by having one end thereof disposed between an outlet of said refrigerant-water heat exchanger and an inlet of said fifth open/close valve and the other end formed of said first three-way valve;

a second three-way valve which is disposed between said further outlet of said internal heat exchanger and an inlet of said second decompressor;

a fifth bypass circuit which is connected by having one end thereof formed of said second three-way valve and the other end thereof disposed between an outlet of said fifth open/close valve and an inlet of said first decompressor;

a sixth bypass circuit which is connected by having one end thereof disposed between an outlet of said first heat exchanger and said first three-way valve and the other end thereof disposed between said second three-way valve and said second decompressor and by way of a sixth open/close valve; and refrigerant circulation mode changeover means which selectively changes over a steady mode in which the refrigerant which is flown out from said refrigerant-water heat exchanger is circulated by way of said fifth open/close valve and a start mode in which the refrigerant is circulated in said fourth bypass circuit and said fifth bypass circuit.

6. A refrigerating cycle device according to claim 1, wherein during the adjustment of the degree of the opening of the second decompressor at the time of heating and dehumidifying, a refrigerant temperature Teva of the second heat exchanger is detected, a set refrigerant temperature Txeva and the detected refrigerant temperature Teva are compared, and the degree of the opening of the second decompressor is decreased when the detected refrigerant temperature Teva is equal to or more than the set refrigerant temperature Txeva and is increased when the detected refrigerant temperature Teva is less than the set refrigerant temperature Txeva.

7. A refrigerating cycle device according to claim 1, wherein the air conditioning capacity is further adjusted by adjusting a degree of an opening of the first decompressor at the time of heating and dehumidifying.

8. A refrigerating cycle device according to claim 7, wherein during the adjustment of the degree of the opening of the first decompressor at the time of heating and dehumidifying, a refrigerant temperature Tm of the first heat exchanger is detected, a set refrigerant temperature Txm and the detected refrigerant temperature Tm are compared, and the degree of the opening of the first decompressor is decreased when the detected refrigerant temperature Tm is equal to or more than the set refrigerant temperature Txm and is increased when the detected refrigerant temperature Tm is less than the set refrigerant temperature Txm, a refrigerant temperature Teva of the second heat exchanger is detected, a set refrigerant temperature Txeva and the detected refrigerant temperature Teva are compared, and the degree of the opening of the first decompressor is decreased when the detected refrigerant temperature Teva is equal to or more than the set refrigerant temperature Txeva and is increased when the detected refrigerant temperature Teva is less than the set refrigerant temperature Txeva.

9. A refrigerating cycle device according to claim 1, wherein the refrigerating cycle device comprises blow-off air temperature detection means which detects a temperature of blow-off air blown off by way of said heater core and compressor operating frequency control means which controls an operating frequency of said compressor, and said compressor operating frequency control means controls the operating frequency of said compressor in response to said detected air temperature.

10. A refrigerating cycle device according to claim 1, wherein the refrigerating cycle device comprises discharged refrigerant temperature detection means which detects a discharged refrigerant temperature of said compressor and a bypass circuit which bypasses between an outlet of said second heat exchanger and an inlet of said compressor by way of an open/close valve, and said open/close valve has opening and closing thereof controlled in response to said detected discharged refrigerant temperature.

11. A refrigerating cycle device according to claim 1, which is used as an air conditioner for a vehicle.

* * * * *